United States Patent
Lee et al.

(10) Patent No.: US 11,317,063 B2
(45) Date of Patent: Apr. 26, 2022

(54) CALIBRATION MODULE OF IMAGE SENSOR, IMAGE SENSOR AND METHOD OF CALIBRATING CROSSTALK IN IMAGE SENSOR

(71) Applicant: Samsung Electronics Co., Ltd., Suwon-si (KR)

(72) Inventors: Dahee Lee, Suwon-si (KR); Yongseong Kim, Suwon-si (KR); Youngmi Jo, Hwaseong-si (KR); Dongki Min, Seoul (KR); Wooseok Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/995,085

(22) Filed: Aug. 17, 2020

(65) Prior Publication Data

US 2021/0227185 A1    Jul. 22, 2021

(30) Foreign Application Priority Data

Jan. 21, 2020 (KR) ........................ 10-2020-0007772

(51) Int. Cl.
| | |
|---|---|
| *H04N 9/04* | (2006.01) |
| *H04N 5/355* | (2011.01) |
| *H04N 17/02* | (2006.01) |
| *H04N 17/00* | (2006.01) |

(52) U.S. Cl.
CPC ........... *H04N 9/0451* (2018.08); *H04N 5/355* (2013.01); *H04N 9/0455* (2018.08); *H04N 17/002* (2013.01); *H04N 17/02* (2013.01)

(58) Field of Classification Search
CPC .... H04N 9/0451; H04N 9/0455; H04N 5/355; H04N 17/02; H04N 17/002; H04N 9/735; H04N 9/69; H04N 5/357; H04N 9/04559
See application file for complete search history.

(56) References Cited

U.S. PATENT DOCUMENTS

| | | | |
|---|---|---|---|
| 6,456,325 B1 * | 9/2002 | Hayashi | ............... H04N 9/0451 348/234 |
| 8,593,539 B2 | 11/2013 | Ogawa | |
| 9,264,689 B2 | 2/2016 | Li et al. | |

(Continued)

FOREIGN PATENT DOCUMENTS

KR    10-1888832    11/2011

*Primary Examiner* — Michael E Teitelbaum
(74) *Attorney, Agent, or Firm* — Harness, Dickey & Pierce, P.L.C.

(57) ABSTRACT

An image sensor including a pixel array including a plurality of sub-pixels arranged along a plurality of rows and a plurality of columns, and k number of sub-pixels representing one color pixel in conjunction with each other, where k is an integer equal to or greater than four and calibration circuitry may be provided. The calibration circuitry may be configured to receive digital image signal generated based on pixel signals output from the pixel array, calculate a color gain of the digital image signal based on a coefficient set calculated based on a reference image signal generated by a reference image sensor under a first light source having a first color temperature, store coefficient sets associated with a plurality of color temperatures including the first color temperature, and apply the color gain to the digital image signal to generate a calibrated image signal.

17 Claims, 21 Drawing Sheets

(56) References Cited

U.S. PATENT DOCUMENTS

| | | |
|---|---|---|
| 9,270,866 B2 | 2/2016 | Liu |
| 9,307,214 B1 | 4/2016 | Liu et al. |
| 9,367,916 B1 | 6/2016 | Pally et al. |
| 9,741,117 B2 | 8/2017 | Richards et al. |
| 10,015,424 B2 | 7/2018 | Kasai |
| 10,225,495 B2 | 3/2019 | Lee et al. |
| 2003/0112342 A1* | 6/2003 | Takeuchi ............... H04N 9/735 348/223.1 |
| 2012/0200731 A1 | 8/2012 | Park et al. |
| 2019/0082153 A1 | 3/2019 | Zhuang et al. |

* cited by examiner 641  642  643  644

651  652  653  654

CALIBRATION MODULE OF IMAGE SENSOR, IMAGE SENSOR AND METHOD OF CALIBRATING CROSSTALK IN IMAGE SENSOR

CROSS-REFERENCE TO RELATED APPLICATION

This application claims priority under 35 USC § 119 to Korean Patent Application No. 10-2020-0007772, filed on Jan. 21, 2020 in the Korean Intellectual Property Office (KIPO), the content of which is herein incorporated by reference in its entirety.

BACKGROUND

1. Technical Field

Example embodiments relate to image sensors, and more particularly to calibration modules of image sensors, image sensors and methods of calibrating crosstalk in the image sensors.

2. Description of the Related Art

An image sensor is a semiconductor device that converts a photo image (e.g., light) reflected by a subject into an electric signal. Thus, image sensors are widely used in portable electronic devices such as digital cameras, cellular phones, and the like. Generally, image sensors can be classified into charged coupled device (CCD) image sensors and complementary metal oxide semiconductor (CMOS) image sensors. CMOS image sensors have some advantages over CCD image sensors such as low manufacturing costs, low power consumption, ease of integration with peripheral circuits, and the like. Recently, image sensors employing various configurations are used.

SUMMARY

Some example embodiments provide calibration modules or calibration circuitries of an image sensor that is capable of efficiently processing crosstalk of signals output from a pixel array in the image sensor.

Some example embodiments provide image sensors having multi-photodiodes architecture, which include the calibration module.

Some example embodiments provide methods of calibrating crosstalk in an image sensor.

According to some example embodiments, an image sensor may include a pixel array including a plurality of sub-pixels arranged along a plurality of rows and a plurality of columns, and k number of sub-pixels representing one color pixel in conjunction with each other, where k is an integer equal to or greater than four, and calibration circuitry configured to receive digital image signal generated based on pixel signals output from the pixel array, calculate a color gain of the digital image signal based on a coefficient set calculated based on a reference image signal generated by a reference image sensor under a first light source having a first color temperature, store coefficient sets associated with a plurality of color temperatures including the first color temperature, and apply the color gain to the digital image signal to generate a calibrated image signal.

According to some example embodiments, an image sensor may include pixel array including a plurality of sub-pixels arranged along a plurality of rows and a plurality of columns, and k number of sub-pixels representing one color in conjunction with each other, where k is an integer equal to or greater than four, an analog-to-digital converter (ADC) configured to perform an analog-to-digital conversion on a pixel signal output from the pixel array to generate a digital image signal, and calibration circuitry configured to receive the digital image signal, and calibrate a color temperature of the digital image signal based on a reference color gain of a reference image signal to output a calibrated image signal, the reference image signal being generated by a reference image sensor.

According to some example embodiments, there is provided a method of calibration crosstalk in an image sensor. The image sensor includes a pixel array including a plurality of sub-pixels arranged along a plurality of rows and a plurality of columns, k number of sub-pixels represents one color are formed in conjunction with each other, and the number k is an integer equal to or greater than four. According to the method, digital image signal generated based on pixel signal output from the pixel array is received at a calibration module of the image sensor, a color temperature of each of pixels in the digital image signal is calibrated, at the calibration module, based on coefficient set calculated based on a reference image signal generated by a reference image sender under a first light source having a first color temperature, and the calibrated image signal is output at the calibration module. According to some example embodiments, a method of calibrating crosstalk in an image sensor, the image sensor including a pixel array including a plurality of sub-pixels arranged along a plurality of rows and a plurality of columns, k number of sub-pixels representing one color in conjunction with each other, where k is an integer equal to or greater than four may be provided. The method may include receiving, at calibration circuitry of the image sensor, a digital image signal generated based on pixel signals output from the pixel array, calibrating, at the calibration circuitry, a color temperature of each of pixels in the digital image signal based on a coefficient set calculated based on a reference image signal generated by a reference image sensor under a first light source having a first color temperature, and outputting, at the calibration circuitry, a calibrated image signal.

According to some example embodiments, the calibration circuitry may calibrate color temperature of the digital image signal generated by the target image sensor by calculating color gains of the digital image signal at color temperatures different from a reference color temperature based on color gains of a digital image signal generated by the reference image sensor at a plurality of color temperatures.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Various example embodiments will be described more fully with reference to the accompanying drawings, in which embodiments are shown.

Figure 1:
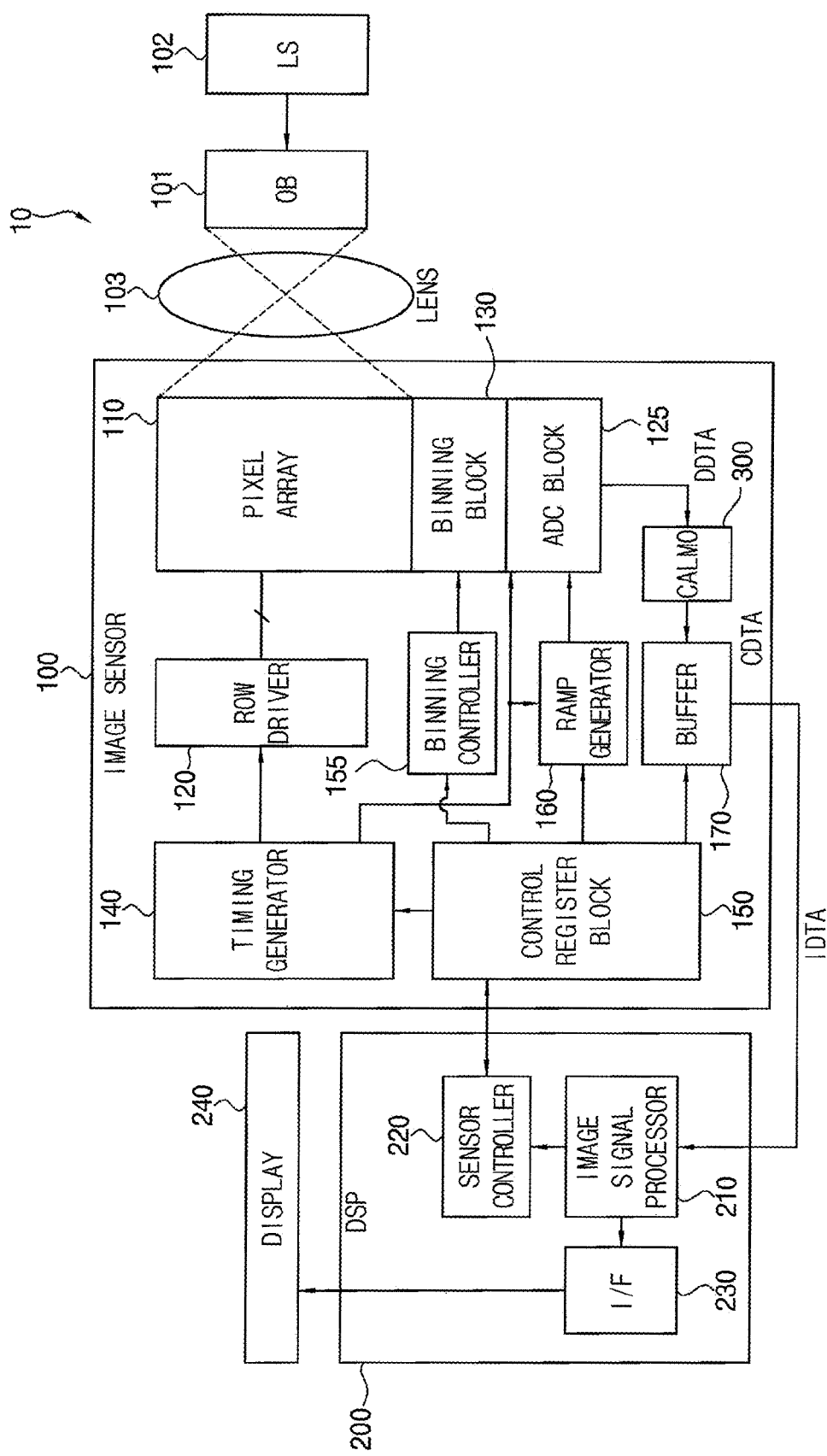
FIG. 1 is a block diagram illustrating an image processing system according to some example embodiments.

FIG. 1 is a block diagram illustrating an image processing system according to some example embodiments.

Referring to FIG. 1, an image processing system 10 may be implemented as a portable electronic device such as, including but not limited to, a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

The image processing system 10 may include an optical lens 103, a complementary metal-oxide-semiconductor (CMOS) image sensor (or, an image sensor) 100, a digital signal processor (DSP) 200, and a display 240.

The image sensor 100 may generate image data IDTA corresponding to an object 101 input through the optical lens 103. The image data IDTA may correspond to a result of light signals reflected by the object 101 under a first light source (LS) 102 and received through the optical lens 103. The image data IDTA may correspond to pixel signals output from a plurality of photoelectric conversion elements. A photoelectric conversion element may be implemented as a photodiode, a phototransistor, a photogate, or a pinned-photodiode.

The image sensor 100 may include a pixel array 110, a row driver 120, an analog-to-digital converter (ADC) block (or alternatively, analog-to-digital converter) 125, a binning block 130, a timing generator 140, a control register block 150, a binning controller 155, a ramp generator 160, a calibration module (or alternatively, calibration circuitry) (CALMO) 300 and a buffer 170.

The pixel array 110 may include a plurality of sub-pixels arranged in two dimensions. The sub-pixels of the image sensor 100 may be manufactured using CMOS manufacturing processes. Each of the sub-pixels may include a plurality of photoelectric conversion elements. In example embodiments, one color pixel may be represented by k number of sub-pixels which are in conjunction with each other, where the k is an integer equal to or greater than four.

Each of the sub-pixels included in the pixel array 110 may include a photodiode. The photodiode is an example of a photoelectric conversion element and may be replaced with a phototransistor, a photogate, or a pinned-photodiode. The sub-pixels may be arranged in a matrix in the pixel array 110. Each of the sub-pixels may transmit a pixel signal to a column line.

The row driver 120 may drive control signals for controlling the operation of the sub-pixels to the pixel array 110 according to the control of the timing generator 140. The row driver 120 may function as a control signal generator which generates the control signals.

The timing generator 140 may control the operations of the row driver 120, the ADC block 125, and the ramp generator 160 according to the control of the control register block 150. The timing generator 140 may control the operation of the ADC block 125 and determine activating or deactivating ADCs included in the ADC block 125 according to the control of the control register block 150.

The binning block 130 may bin a pixel signal output from each of the sub-pixels included in the pixel array 110 and may output a binned pixel signal.

The ADC block 125 may include an ADC and memory for each column. The ADC may perform correlated double sampling (CDS). The ADC block 125 may include a plurality of ADCs. Each of the ADCs may be shared by photoelectric conversion elements in a corresponding pixel. The ADC block 125 may perform an analog-to-digital conversion on a pixel signal output from the pixel array to generate a digital image signal DDTA. The ADC block 125 may generate a digital image signal DDTA corresponding to the binned pixel signal output from the binning block 130.

The control register block 150 may control the operations of the timing generator 140, the binning controller 155, the ramp generator 160, and the buffer 170 according to the control of the DSP 200. The binning controller 155 may control the binning block 130 according to the control of the control register block 150.

The calibration module 300 may receive the digital image signal DDTA, may calculate a color gain of the digital image signal DDTA based on a coefficient set calculated based on a reference image signal generated by a reference image sensor (not specifically shown) under a first light source having a first color temperature, may apply the color gain to the digital image signal DDTA to output a calibrated image signal CDTA. The calibration module 300 may calculate the color gain by applying a coefficient set associated with the first color temperature to a color gain calculated under a reference color temperature.

The buffer 170 may transmit the image data IDTA corresponding to calibrated image signals CDTA output from the calibration module 300 to the DSP 200.

The DSP 200 may include an image signal processor (ISP) 210, a sensor controller 220, and an interface (I/F) 230.

The ISP 210 may control the interface 230 and the sensor controller 220, which controls the control register block 150. The CMOS image sensor 100 and the DSP 200 may be implemented in a single package, e.g., a multi-chip package (MCP).

Although the image sensor 100 and the ISP 210 are separated from each other in FIG. 1, the ISP 210 may be implemented as a part of the image sensor 100 in some example embodiments.

The ISP 210 may process the image data IDTA received from the buffer 170 and may transmit processed image data to the I/F 230. For example, the ISP 210 may interpolate the image data IDTA corresponding to pixel signals output from the sub-pixels to generate interpolated image data.

The sensor controller 220 may generate various control signals for controlling the control register block 150 according to the control of the ISP 210. The interface 230 may transmit the processed image data (e.g., the interpolated image data) from the ISP 210 to the display 240.

The display 240 may display the interpolated image data output from the interface 230. The display 240 may be, including but not limited to, a thin film transistor-liquid crystal display (TFT-LCD), a light emitting diode (LED) display, an organic LED (OLED) display, an active-matrix OLED (AMOLED) display, or a flexible display.

As a digital technology develops, a digital camera capable of shooting an image without a film is being rapidly developed.

The core of a digital camera may include an image sensor unit that captures an image, or an image processing unit that processes converted digital signals. Due to a difference in image quality and a color of a digital camera and those of a film camera, a study and an improvement in an image processing field of the digital camera are needed. For example, a color processing for a natural color reproduction is much needed in an image processing field.

When shooting the same subject using a digital image device such as a digital still camera, a digital video camera, etc., an apparent color shot becomes different depending on various light source conditions such as a solar light, cloudy weather, white lightning, fluorescent lightning, etc.

Because a human eye adapts itself to a light source to feel white as white, the human eye does not feel unnaturalness. However, in a digital image device, color temperature sufficiently responds to RGB components included in different light sources. If the color temperature is high, the color is reproduced as white tinged with blue. If the color temperature is low, the color is reproduced as white tinged with red.

Thus, even in the case that color temperature is changed, it is desirable to maintain a white balance. To achieve this, it is controlled such that in an achromatic color subject, an RGB ratio is always constant or color difference signals R-Y, B-Y become always substantially zero. Performance of that function is called a white balance correction. That is, in white tinged with blue, gain of R (red) is increased more than gain of B (blue), and in white tinged with red, gain of B (blue) is increased more than gain of R (red).

Figure 2:
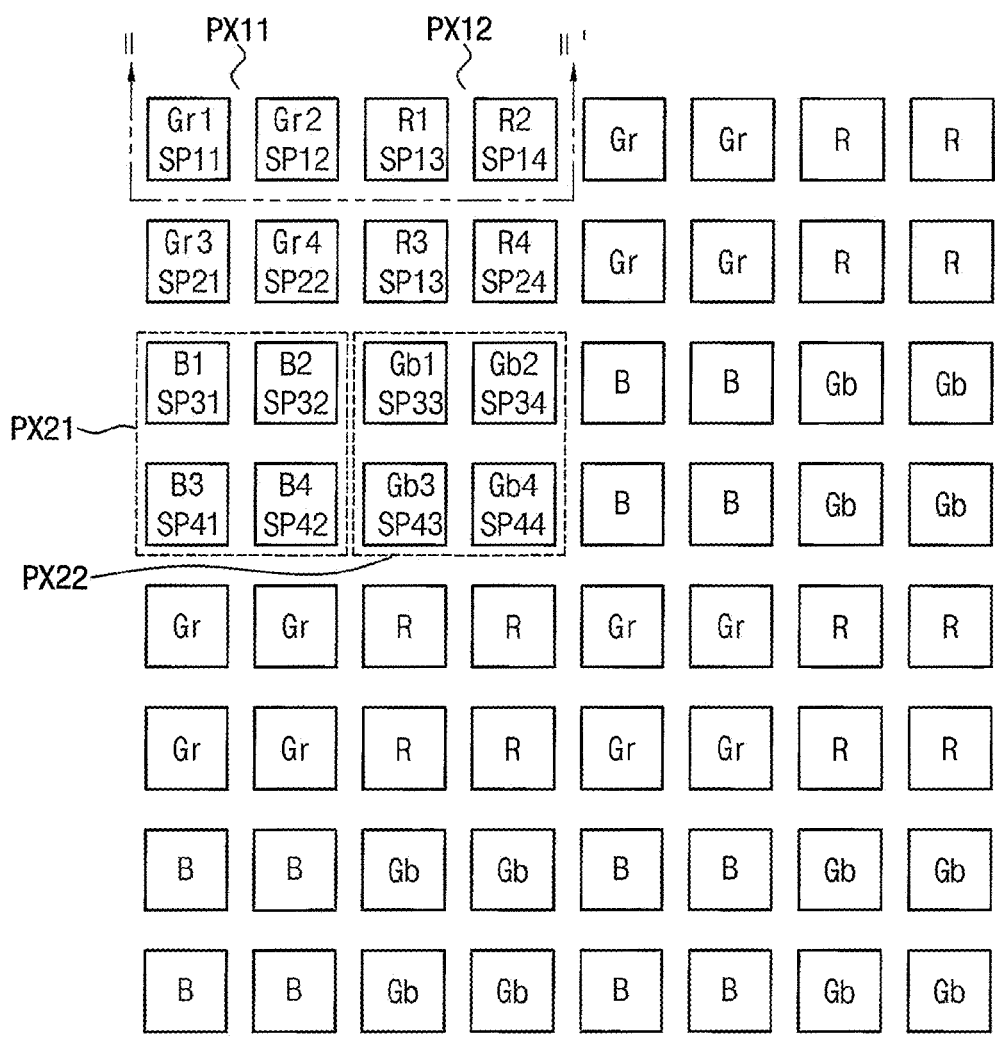
FIG. 2 is a block diagram illustrating the pixel array in the image processing system of FIG. 1 according to some example embodiments.

FIG. 2 is a block diagram illustrating the pixel array in the image processing system of FIG. 1 according to some example embodiments.

The pixel array illustrated in FIG. 2 may include a color filter array (not shown) of the pixel array.

A pixel array may have an 8*8 (* denotes a multiplication) matrix structure. Furthermore, it is assumed that one pixel PIX includes four sub-pixels SP adjacently arranged. However, the scope and spirit of the inventive concept may not be limited thereto, but the arrangement of the pixel array 110 and a color filter array may be variously changed or modified without departing from the scope and spirit of the inventive concepts.

Referring to FIG. 2, the pixel array 110 may include a plurality of pixels PIX11~PIX22. As illustrated in FIG. 2, the plurality of pixels PIX11 to PIX22 may include a plurality of sub-pixels SP11~SP44.

For example, the pixel PX11 may include sub-pixels SP11, SP12, SP21, and SP22. Each of the sub-pixels SP11, SP12, SP21, and SP22 may include a first color filter (for example, a first green (Gr) color filter). That is, the sub-pixels SP11, SP12, SP21, and SP22 may convert green light into an electrical signal.

The pixel PX12 may include sub-pixels SP13, SP14, SP23, and SP24. Each of the sub-pixels SP13, SP14, SP23, and SP24 may include a second color filter (for example, a red (R) color filter). That is, the sub-pixels SP13, SP14, SP23, and SP24 may convert red light into an electrical signal.

The pixel PX21 may include sub-pixels SP31, SP32, SP41, and SP42. Each of the sub-pixels SP31, SP32, SP41, and SP42 may include a third color filter (for example, a blue (B) color filter). That is, the sub-pixels SP31, SP32, SP41, and SP42 may convert red light into an electrical signal.

The pixel PX22 may include sub-pixels SP33, SP34, SP43, and SP44. Each of the sub-pixels SP33, SP34, SP43, and SP44 may include a fourth color filter (for example, a second green (Gb) color filter). That is, the sub-pixels SP33, SP34, SP43, and SP44 may convert green light into an electrical signal.

One pixel PX may include four sub-pixels which are adjacently arranged, and four sub-pixels included in one pixel may include (e.g., share) the same color filter.

In some example embodiments, the four pixels PX11, PX12, PX21, and PX22 may constitute a Bayer pattern. The Bayer pattern is described with reference to FIG. 2. However, the scope and spirit of the inventive concepts may not be limited thereto. For example, the pixel array 110 may include various color filter array patterns such as an RGBE pattern, a CYGM pattern, a CYYM pattern, and the like.

Figure 3:
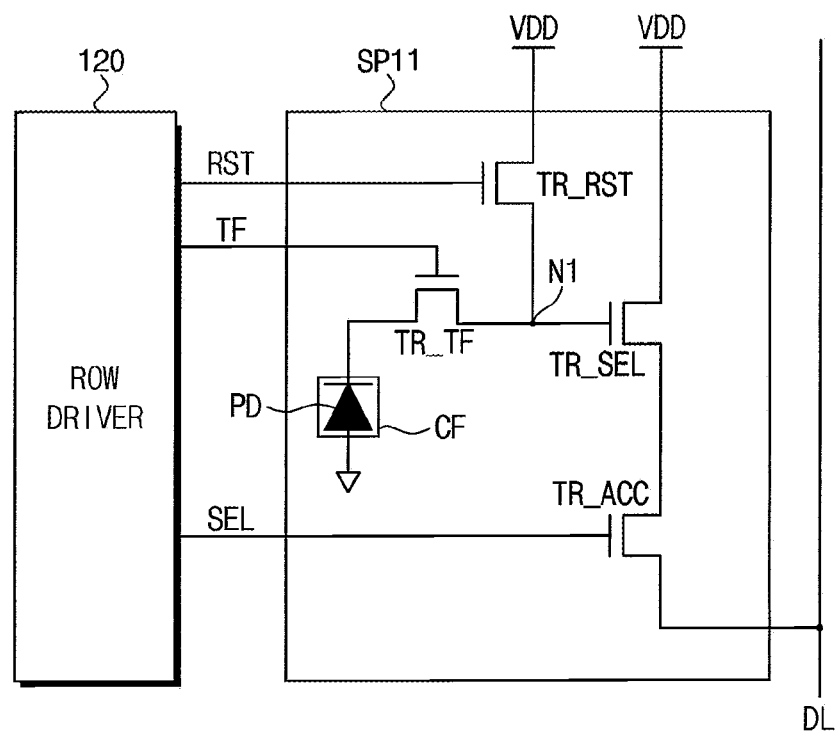
FIG. 3 is a diagram for describing one sub-pixel illustrated in FIG. 2 according to some example embodiments.

FIG. 3 is a diagram for describing one sub-pixel illustrated in FIG. 2 according to some example embodiments.

An example embodiment of the inventive concepts is exemplified in FIG. 3 as a sub-pixel having a 4TR structure. However, the scope and spirit of the inventive concepts may not be limited thereto. A sub-pixel may be changed or modified to have a 1TR structure, a 3TR structure, or any other pixel structure.

Referring to FIGS. 2 and 3, the sub-pixel SP11 may be connected to the row driver 120 through a reset line RST, a transfer line TF, and a selection line SEL. The sub-pixel SP11 may include a photodiode PD, a transfer transistor TR_TF, a reset transistor TR_RST, a selection transistor TR_SEL, and an access transistor TR_ACC.

One end of the transfer transistor TR_TF may be connected to a cathode of the photodiode PD, the other end thereof may be connected to a first node N1, and a control electrode thereof may be connected to the transfer line TF. One end of the reset transistor TR_RST may be connected to receive a power supply voltage VDD, the other end thereof may be connected to the first node N1, and a control electrode thereof may be connected to the reset line RST.

One end of the selection transistor TR_SEL may be connected to receive the power supply voltage VDD, the other end thereof may be connected to one end of the access transistor TR_ACC, and a control electrode thereof may be connected to the first node N1. The other end of the access transistor TR_ACC may be connected to a column line CL, and a control electrode thereof may be connected to the selection line SEL.

The photodiode PD may generate charges in response to light passing through a color filter CF. The color filter CF may be configured such that light of a predetermined color is transmitted. In some example embodiments, as described with reference to FIG. 2, the color filter CF of the sub-pixel SP11 may be a first green (Gr) color filter. In this case, light which passes through the color filter CF may be green light, and the photodiode PD may generate charges in response to the green light.

The transfer transistor TR_TF may provide the first node N1 with charges, which are generated by the photodiode PD, in response to a control signal on the transfer line TF. The reset transistor TR_RST may reset a potential of the node N1 to the power supply voltage VDD in response to a signal on the reset line RST.

The selection transistor TR_SEL may provide the power supply voltage VDD to a drain of the access transistor TR_ACC in response to a voltage on the first node N1. As the selection transistor TR_SEL operates, a drain voltage of the access transistor TR_ACC may vary in proportion to a voltage on the first node N1.

That is, a variation in a drain voltage of the access transistor TR_ACC may correspond to a variation in the amount of charges generated by the photodiode PD. In other words, the variation in the drain voltage may be a value corresponding to data captured by the photodiode PD. The access transistor TR_ACC may provide the column line CL with data (e.g., a changed voltage) in response to a signal on the selection line SEL.

FIGS. 4A through 5B are cross-sectional views of pixels taken along the line II-II' illustrated in the pixel array of FIG. 2, according to some example embodiments.

Figure 4A:
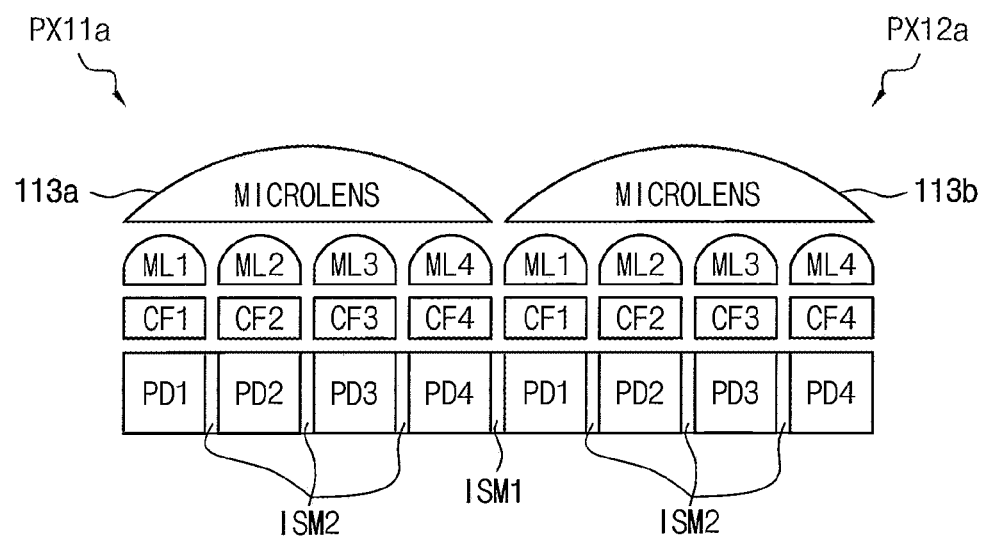
FIGS. 4A through 5B are cross-sectional views of pixels taken along the line II-II' illustrated in the pixel array of FIG. 2, according to some example embodiments.

Referring to FIGS. 2 and 4A, a first pixel PX11a may include four photodiodes PD1 through PD4, color filters CF1 through CF4 respectively placed on the four photodiodes PD1 through PD4, microlenses ML1 through ML4 respectively placed on the color filters CF1 through CF4, and a microlens 113a placed on the microlenses ML1 through ML4. The color filters CF1 through CF4 may be green color filters.

A second pixel PX12a may include four photodiodes PD1 through PD4, the color filters CF1 through CF4 respectively placed on the four photodiodes PD1 through PD4, the microlenses ML1 through ML4 respectively placed on the color filters CF1 through CF4, and a microlens 113b placed on the microlenses ML1 through ML4. The color filters CF1 through CF4 may be red color filters.

A first isolation material ISM1 may be placed between the first pixel PX11a and the second pixel PX12a. A second isolation material ISM2 may be placed among the four photodiodes PD1 through PD4 (e.g., between respective adjacent pairs of the four photodiodes PD1 through PD4) in each pixel PX11a or PX12a. The first and second isolation materials ISM1 and ISM2 may be formed using deep trench isolation (DTI).

Figure 4B:
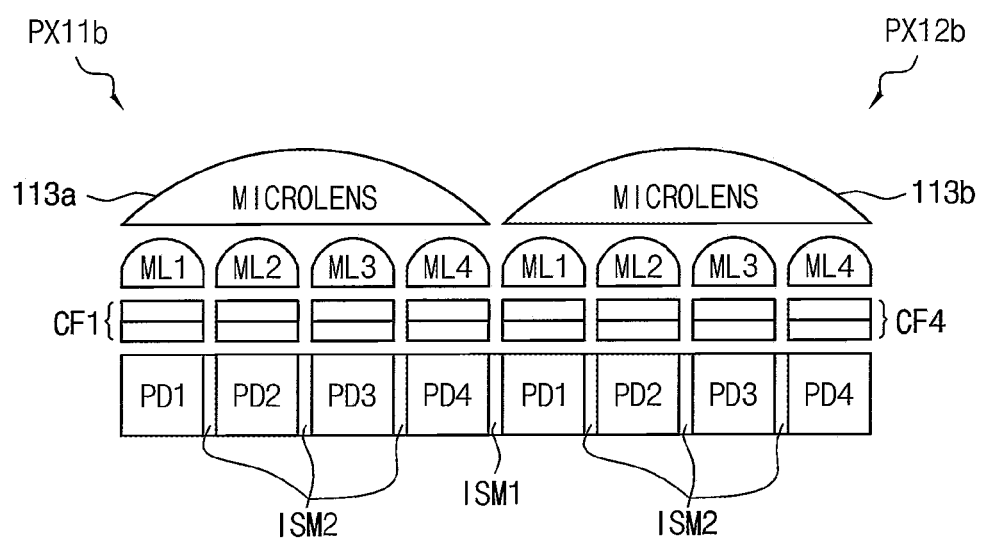

Referring to FIGS. 2 and 4B, a first pixel PX11b may include four photodiodes PD1 through PD4, color filters CF1 through CF4 respectively placed on the four photodiodes PD1 through PD4, microlenses ML1 through ML4 respectively placed on the color filters CF1 through CF4, and a microlens 113a placed on the microlenses ML1 through ML4. Each of the color filters CF1 through CF4 may include a plurality of color filter layers having same filtering characteristic.

A second pixel PX12b may include four photodiodes PD1 through PD4, the color filters CF1 through CF4 respectively placed on the four photodiodes PD1 through PD4, the microlenses ML1 through ML4 respectively placed on the color filters CF1 through CF4, and a microlens 113b placed on the microlenses ML1 through ML4.

Each of the color filters CF1 through CF4 may include a plurality of color filter layers having same filtering characteristic. A first isolation material ISM1 may be placed between the first pixel PX11a and the second pixel PX12a. A second isolation material ISM2 may be placed among the four photodiodes PD1 through PD4 (e.g., between respective adjacent pairs of the four photodiodes PD1 through PD4) in each pixel PX11b or PX12b.

Figure 5A:
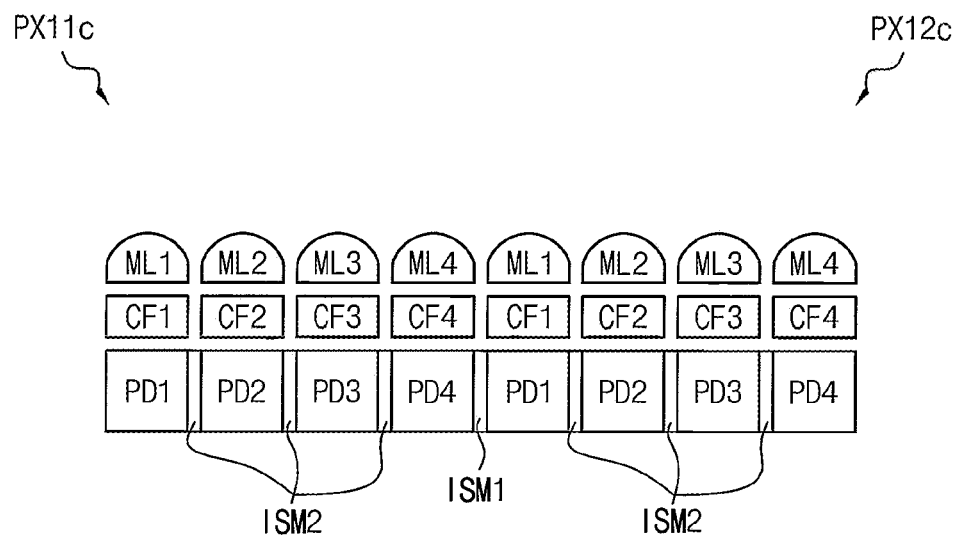

Referring to FIGS. 2 and 5A, a first pixel PX11c may include four photodiodes PD1 through PD4, the color filters CF1 through CF4 respectively placed on the four photodiodes PD1 through PD4, and the microlenses ML1 through ML4 respectively placed on the color filters CF1 through CF4. The color filters CF1 through CF4 may be green color filters.

A second pixel PX12c may include four photodiodes PD1 through PD4, the color filters CF1 through CF4 respectively placed on the four photodiodes PD1 through PD4, and the microlenses ML1 through ML4 respectively placed on the color filters CF1 through CF4. The color filters CF1 through CF4 may be red color filters.

A first isolation material ISM1 may be placed between the first pixel PX11c and the second pixel PX12c. A second isolation material ISM2 may be placed among the four photodiodes PD1 through PD4 (e.g., between an adjacent pair of the four photodiodes PD1 through PD4) in each pixel PX11c or PX12c. The first and second isolation materials ISM1 and ISM2 may be formed using DTI.

Figure 5B:
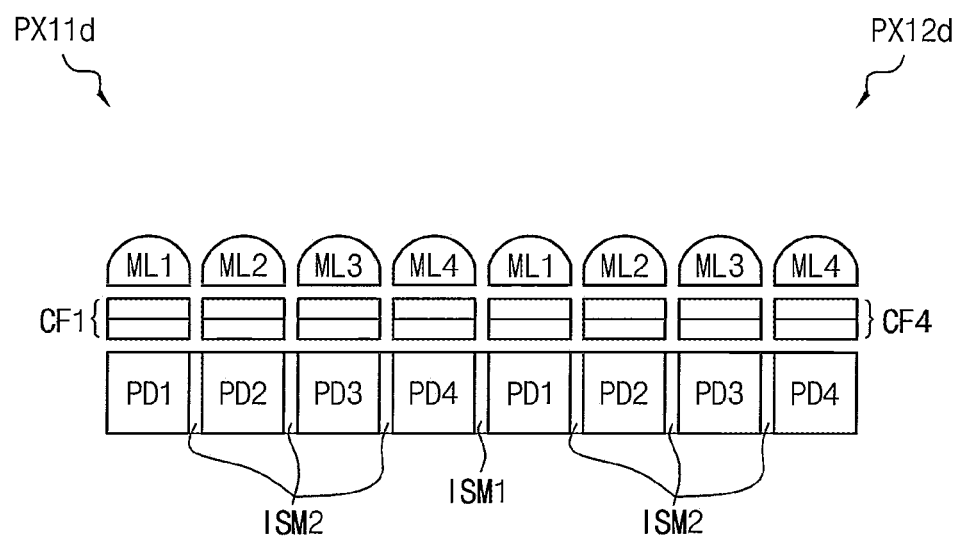

Referring to FIGS. 2 and 5B, a first pixel PX11d may include four photodiodes PD1 through PD4, the color filters CF1 through CF4 respectively placed on the four photodiodes PD1 through PD4, and the microlenses ML1 through ML4 respectively placed on the color filters CF1 through CF4. Each of the color filters CF1 through CF4 may include a plurality of color filter layers having same filtering characteristic.

A first pixel PX12d may include four photodiodes PD1 through PD4, the color filters CF1 through CF4 respectively placed on the four photodiodes PD1 through PD4, and the microlenses ML1 through ML4 respectively placed on the color filters CF1 through CF4.

Each of the color filters CF1 through CF4 may include a plurality of color filter layers having same filtering characteristic. A first isolation material ISM1 may be placed between the first pixel PX11*d* and the second pixel PX12*d*. A second isolation material ISM2 may be placed among the four photodiodes PD1 through PD4 (e.g., between an adjacent pair of the four photodiodes PD1 through PD4) in each pixel PX11*d* or PX12*d*.

Figure 6:
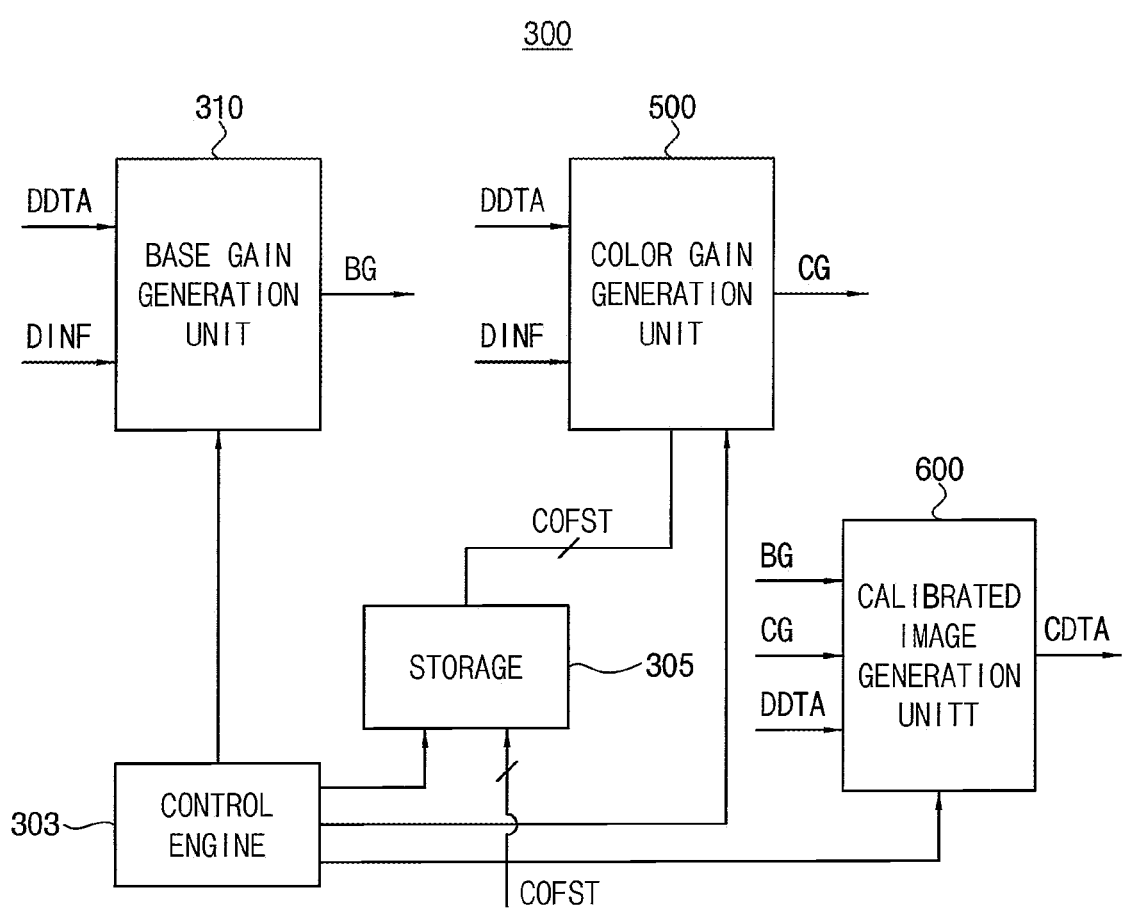
FIG. 6 is a block diagram illustrating a calibration module in FIG. 1 according to some example embodiments.

FIG. 6 is a block diagram illustrating the calibration module 300 in FIG. 1 according to some example embodiments.

Referring to FIG. 6, the calibration module 300 may include a control engine 303, a storage 305, a base gain generation unit 310, a color gain generation unit 500 and a calibrated image generation unit 600.

The base gain generation unit 310 may receive the digital image signal DDTA and input information IDINF which is associated with at least a size of digital image signal DDTA and may generate a base gain BG of the digital image signal DDTA based on the input information IDINF and the digital image signal DDTA. The input information IDINF may include size information of the digital image signal DDTA and a pedestal of the digital image signal DDTA.

The storage 305 may be connected to the color gain generation unit 500 and may store coefficient sets COFST associated with respective color temperatures, and may provide the coefficient sets COFST to the color gain generation unit 500.

The storage 305 may be implemented with a nonvolatile memory such as NAND flash or a resistive type memory or may be implemented with a volatile memory such as dynamic random access memory (DRAM) or a static random access memory (SRAM).

In FIG. 6, although it is explained that the storage 305 is included in the calibration module 300, the storage 305 may be disposed outside of the calibration module 300 and may store the coefficient sets COFST associated with respective color temperatures.

The color gain generation unit 500 may receive the digital image signal DDTA, and may calculate a color gain CG of the digital image signal DDTA based on a coefficient set calculated based on a reference image signal (not shown) generated by a reference image sensor (not shown) under a first light source having a first color temperature.

The calibrated image generation unit 600 may calibrate color temperature of pixels in the digital image signal DDTA by applying the base gain BG and the color gain CG to the digital image signal DDTA to output the calibrated image signal CDTA.

The control engine 303 may control the base gain generation unit 310, the color gain generation unit 500, the calibrated image generation unit 600, and the storage 305.

Each of the base gain generation unit 310, the color gain generation unit 500 and the calibrated image generation unit 600 may be implemented with hardware or software. When each of the base gain generation unit 310, the color gain generation unit 500 and the calibrated image generation unit 600 is implemented with software, the base gain generation unit 310, the color gain generation unit 500 and the calibrated image generation unit 600 may be stored in the storage 305. The base gain generation unit 310, the color gain generation unit 500 and the calibrated image generation unit 600 stored in the storage 305 may be driven by the control engine 303.

Each of the base gain generation unit 310, the color gain generation unit 500 may generate the base gain BG and the color gain CG based on the representative channel image signal and stores the base gain BG and the color gain CG in the storage 305, respectively. Therefore, the base gain generation unit 310 and the color gain generation unit 500 may require less storing space of the storage 305 and a number of accesses to the storage 305 may be reduced.

Figure 7:
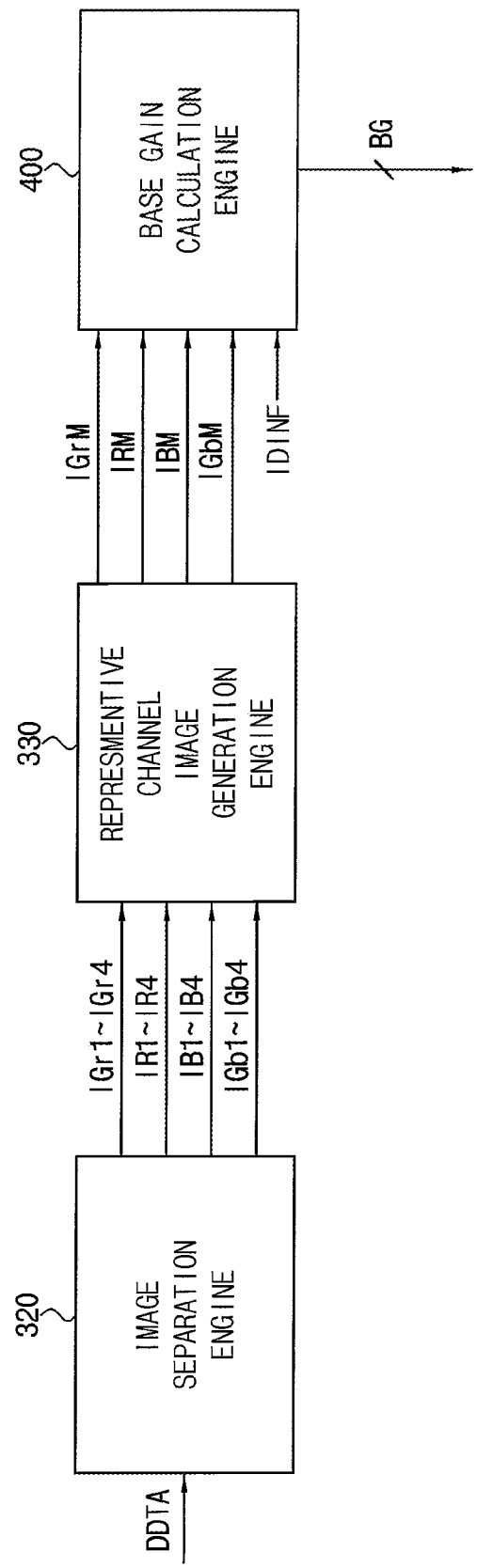
FIG. 7 is a block diagram illustrating the base gain generation unit in the calibration module of FIG. 6 according to some example embodiments.

FIG. 7 is a block diagram illustrating the base gain generation unit 310 in the calibration module of FIG. 6 according to some example embodiments.

Referring to FIG. 7, the base gain generation unit 310 may include an image separation engine 320, a representative channel image generation engine 330, and a base gain calculation engine 400.

The image separation engine 320 may separate the digital image signal DDTA according to a channel of sub-pixels corresponding to each of the color filters in FIG. 2 and may generate 4 k (k is an integer equal to or greater than four) channel image signals IGr1~IGr4, IR1~IR4, IB1~IB4 and IGb1~IGb4.

The representative channel image generation engine 330 may average pixel values with respect to each of the color filters, of each of the 4 k channel image signals IGr1~IGr4, IR1~IR4, IB1~IB4 and IGb1~IGb4 and may generate k representative channel image signals IGrM, IRM, IBM and IGbM.

The representative channel image generation engine 330 may generate the k representative channel image signals IGrM, IRM, IBM and IGbM by averaging corresponding pixel values of the 4 k number of channel image signals IGr1~IGr4, IR1~IR4, IB1~IB4 and IGb1~IGb4 corresponding to respective color filters or by selecting a mean value of the corresponding pixel values. That is, the representative channel image generation engine 330 may calculate a representative value of pixel values of each of the 4 k channel image signals IGr1~IGr4, IR1~IR4, IB1~IB4 and IGb1~IGb4.

The base gain calculation engine 400 may generate the base gain BG based on the k representative channel image signals IGrM, IRM, IBM and IGbM and the input information IDINF. From a description associated with FIG. 7, the number k corresponds to four.

Figure 8:
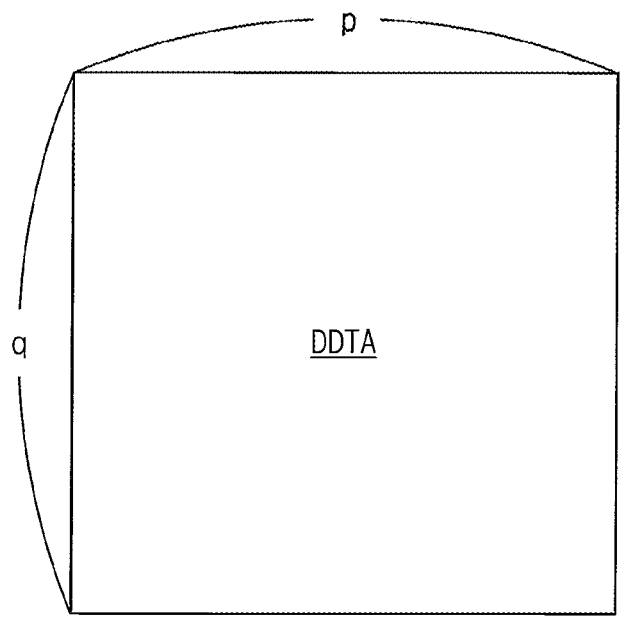
FIG. 8 illustrates sizes of various image signals input to or output from the base gain generation unit of FIG. 7.
Figure 8:
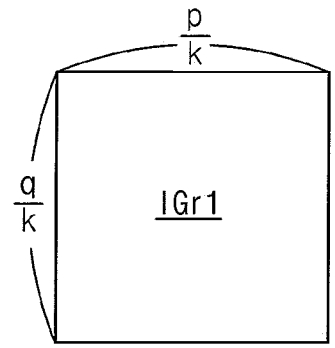
Figure 8:
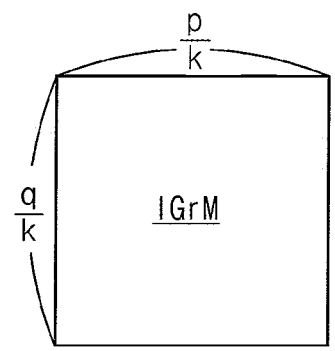
Figure 8:
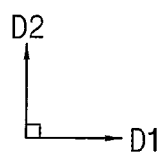

FIG. 8 illustrates sizes of various image signals input to or output from the base gain generation unit 310 of FIG. 7.

Referring to FIG. 8, the digital image signal DDTA may have a first size defined by p (p is a multiple of four and is greater than four) sub-pixels along a first direction D1 and q (q is a multiple of four and is greater than four) sub-pixels along a second direction D2 perpendicular to (or crossing) the first direction D1.

Each of the 4 k channel image signals IGr1~IGr4, IR1~IR4, IB1~IB4 and IGb1~IGb4 may have a second size defined by p/k sub-pixels along the first direction D1 and q/k sub-pixels along the second direction D2. Further, each of the k representative channel image signals IGrM, IRM, IBM and IGbM have a second size defined by p/k sub-pixels along the first direction D1 and q/k sub-pixels along the second direction D2.

Figure 9:
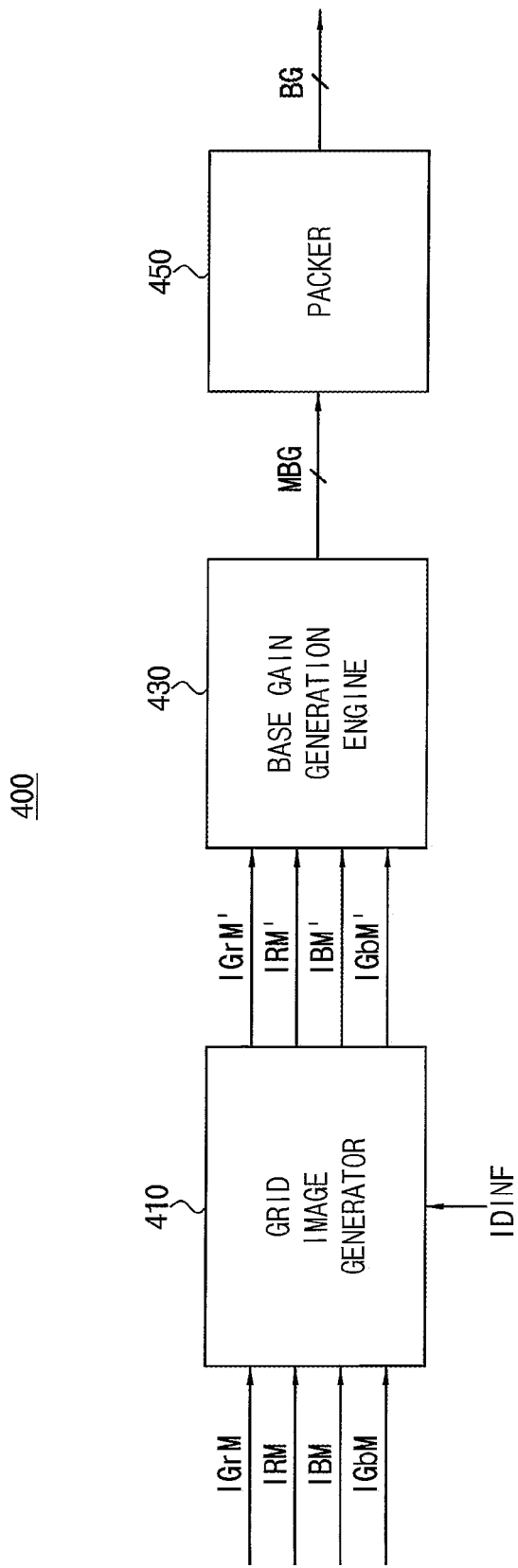
FIG. 9 is a block diagram illustrating the base gain calculation engine in the base gain generation unit of FIG. 7.

FIG. 9 is a block diagram illustrating the base gain calculation engine 400 in the base gain generation unit of FIG. 7.

Referring to FIG. 9, the base gain calculation engine 400 may include a grid image generator 410, a base gain generation engine 430 and a bit packer 450.

The grid image generator 410 may receive the k representative channel image signals IGrM, IRM, IBM and IGbM, may sample r*r (r is an integer equal to or greater than two) sub-pixels of each of the k representative channel image signals IGrM, IRM, IBM and IGbM, as one intersecting point, based on the input information IDINF, and may generate k grid image signals IGrM', IRM', IBM' and IGbM'. Therefore, a number of sub pixels in each of the k grid image signals IGrM', IRM', IBM' and IGbM' may be 1/r^2 of each of the k representative channel image signals IGrM, IRM, IBM and IGbM.

The base gain generation engine 430 may perform a filtering on internal intersecting points of each of the k grid image signals IGrM', IRM', IBM' and IGbM' to generate intermediate base gains MBG for respective ones of the k representative channel image signals IGrM, IRM, IBM and IGbM. The internal intersecting points of each of the k grid image signals IGrM', IRM', IBM' and IGbM' correspond to intersecting points except for boundary intersecting points located in an outskirt region in each of the k grid image signals IGrM', IRM', IBM' and IGbM'. The filtering may be a median filtering, or may be any other schemes to calculate intermediate values.

For example, when each of the k representative channel image signals IGrM, IRM, IBM and IGbM includes s*t sub-pixels (s=p/k, t=q/k), the grid image generator 410 may generate the k grid image signals IGrM', IRM', IBM' and IGbM' such that each unit grid of each of the k representative channel image signals IGrM, IRM, IBM and IGbM include u*u sub pixels. Because, an interval between two grid corresponds to u, each of the k grid image signals IGrM', IRM', IBM' and IGbM' may include F*G grids. F is a natural number equal to or greater than s/u and G is a natural number equal to or greater than t/u.

The base gain generation engine 430 may perform median filtering on pixel values of the internal intersecting points of each of the k grid image signals IGrM', IRM', IBM' and IGbM' to generate the intermediate base gains MBG for each of the k representative channel image signals IGrM, IRM, IBM and IGbM.

When the base gain generation engine 430 may perform v*v (v is an integer equal to or greater than two) median filtering, a number of the intermediate base gains MBG for one of the k representative channel image signals IGrM, IRM, IBM and IGbM corresponds to F*G, and a total number of the intermediate seed values MSV corresponds to 4*F*G.

When one intermediate base gain MBG includes w (w is an integer equal to or greater than two) bytes, the overall intermediate base gains MBG include w*F*G bytes. For reducing amount of bytes of the overall intermediate base gains MBG, the bit packer 450 stores bits of the intermediate base gains MBG, compresses the bits of the intermediate base gains MBG and provides the base gain BG which has smaller bites than the intermediate base gains MBG.

Figure 10:
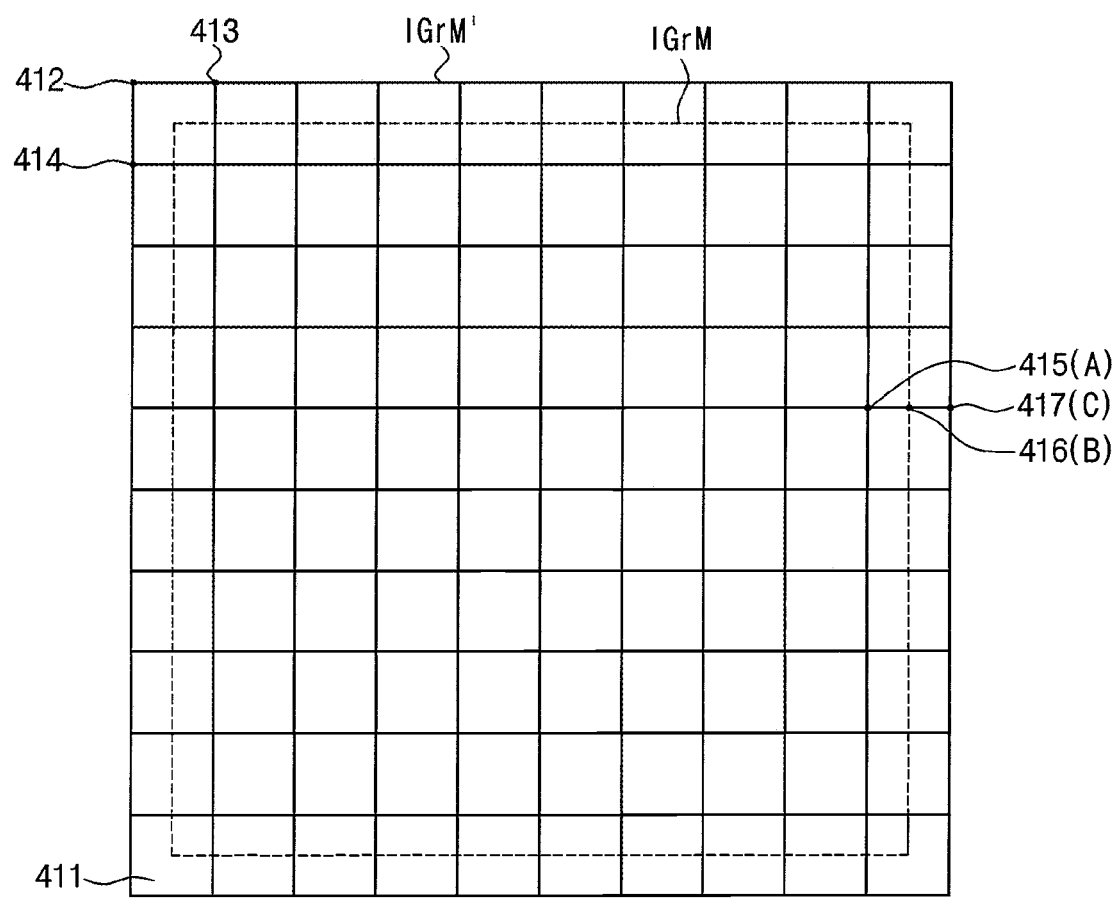
FIG. 10 is a diagram for explaining the grid image signal and the base in the base gain calculation engine in FIG. 9.

FIG. 10 is a diagram for explaining the grid image signal and the base gain in the base gain generation engine 430 in FIG. 9.

In FIG. 10, for convenience of explanation, there will be description on the grid image signal IGrM' for the representative channel image signal IGrM and the base gain BG using the grid image signal IGrM', and similar explanation may be applicable to other grid image signals IRM', IBM' and IGbM'.

Referring to FIG. 10, when it is assumed that the representative channel image signal IGrM includes s*t sub-pixels and one grid 411 includes u*u sub-pixels, the grid image signal IGrM' includes F*G intersecting points.

The base gain generation engine 430 performs a v*v median filtering on the internal intersecting points of the intersecting points in the grid image signal IGrM' and outputs a median value of v^2 pixel values as an intermediate base gain of a corresponding intersecting point. When the base gain generation engine 430 performs the median filtering, the base gain generation engine 430 may filter bad sub pixels from among the v^2 sub-pixels.

The base gain generation engine 430 may calculate an intermediate base gain of a corner intersecting point 412 of the boundary intersecting point by averaging intermediate base gains of intersecting points 413 and 414 adjacent to the corner intersecting point 412. In other words, the base gain generation engine 430 may generate a corresponding intermediate base gain based on pixel values of adjacent two intersecting points for each of corner intersecting points of the boundary intersecting points.

In addition, the base gain generation engine 430 may calculate intermediate base gains of rest boundary intersecting points 417 of the boundary intersecting points, except the corner intersecting points, based on a pixel value of a sub-pixel 416 of the representative channel image signal IGrM corresponding to the rest boundary intersecting point 417 and an intermediate base gain of an intersecting point 415 adjacent to each of the rest boundary intersecting point 417 in a first direction. In other words, the base gain generation engine 430 may generate a corresponding intermediate base gain for each of rest intersecting points of the boundary intersecting points, except the corner intersecting points, based on (1) a pixel value of a sub-pixel of one of the representative channel image signals corresponding to each of the rest intersecting points and (2) a pixel value of an intersecting point adjacent to each of the rest intersecting points in a first direction For example, an intermediate base gain of the intersecting point 415 is A and a pixel value of the sub-pixel 416 is B, the intermediate base gain C of the rest boundary intersecting point 417 may be obtained by C=2*B−A. In this case, it is assumed that each interval of the intersecting point 415, the sub pixel 416 and the boundary intersecting point 417 is substantially identical.

As described with reference to FIGS. 9 and 10, because the base gains BG are calculated by sampling sub-pixels of each of the k representative channel image signals IGrM, IRM, IBM and IGbM, the calibration module 300 may reduce storing space of the storage 305 and a number of accesses to the storage 305.

Figure 11:
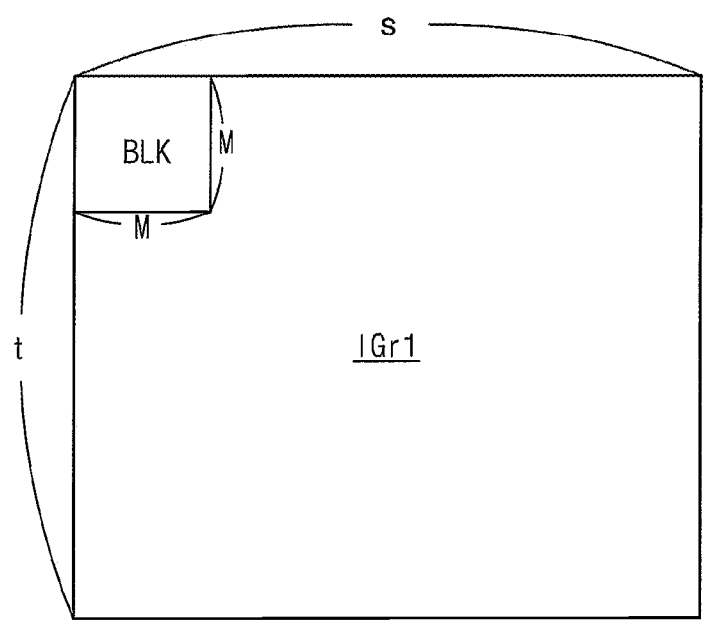
FIG. 11 illustrates that one channel image signal is divided into the plurality of blocks.

FIG. 11 illustrates that one channel image signal is divided into the plurality of blocks.

Referring to FIG. 11, when the channel image signal IGr1 includes s*t sub-pixels and one block BLK is set to include M*M sub-pixels, a number of blocks BLK for covering the s*t sub-pixels is J*K=w, where J is an integer equal to or greater than s/M and K is an integer equal to or greater than t/M.

Figure 12:
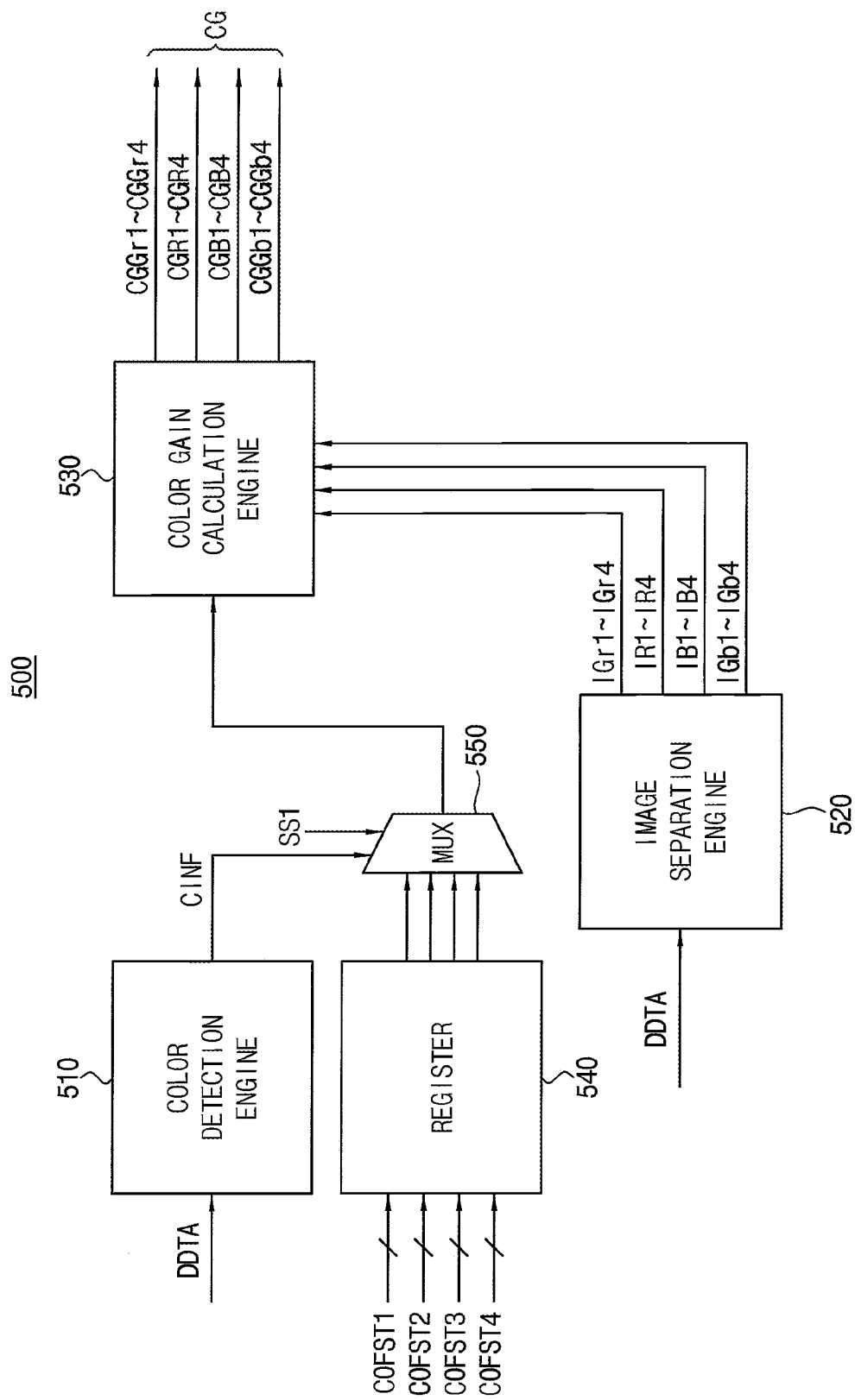
FIG. 12 is a block diagram illustrating the color gain generation unit in the calibration module of FIG. 6 according to some example embodiments.

FIG. 12 is a block diagram illustrating the color gain generation unit in the calibration module of FIG. 6 according to some example embodiments.

Referring to FIG. 12, the color gain generation unit 500 may include a color detection engine 510, an image separation engine 520, a color gain calculation engine 530, a register 540 and a selection circuit 550.

The image separation engine 520 may separate the digital image signal DDTA according to a channel of sub-pixels corresponding to each of the color filters in FIG. 2 to generate the 4 k channel image signals IGr1~IGr4, IR1~IR4, IB1~IB4 and IGb1~IGb4.

The color detection engine 510 may detect a color of the digital image signal DDTA to provide the selection circuit 550 with color information CINF indicating the detected color. The color detection engine 510 may detect the color of the digital image signal DDTA based on hue, saturation and intensity (HIS) color space. The HIS color space may will be described with reference to FIG. 13A.

In some example embodiments, the color detection engine 510 may detect the color of the digital image signal DDTA based on hue, saturation and value (HSV) color space, hue, saturation and lightness (HSL) color space or hue, saturation and brightness (HSB) color space.

Although lightness of the HSL color space and intensity of the HIS color space and value of the HSV color space are not the same value, the lightness of the HSL color space and intensity of the HIS color space and value of the HSV color space may be used as identical concept.

The register 540 may store coefficient sets COTST1, COFST2, COFST3, and COFST4 associated with a plurality of color temperatures or colors of light sources and may provide the selection circuit 550 with the coefficient sets COTST1, COFST2, COFST3, and COFST4.

The selection circuit 550 may select a coefficient set, from among the coefficient sets COFST1, COFST2, COFST3 and COFST4, which is associated with a first (target) color temperature, in response to the color information CINF and a first selection signal SS1.

The color gain calculation engine 530 may apply the coefficient set output from the selection circuit 550 to pixels of each of the 4 k channel image signals IGr1~IGr4, IR1~IR4, IB1~IB4 and IGb1~IGb4, and may generate 4 k color gain maps CGGr1~CGGr4, CGR1~CGR4, CGB1~CGB4 and CGGb1~CGGb4, which will be used to correct the crosstalk of each of the 4 k channel image signals IGr1~IGr4, IR1~IR4, IB1~IB4 and IGb1~IGb4, for 4 k channel image signals IGr1~IGr4, IR1~IR4, IB1~IB4 and IGb1~IGb4 under the target color temperature. The 4 k color gain maps CGGr1~CGGr4, CGR1~CGR4, CGB1~CGB4 and CGGb1~CGGb4 may correspond to the color gain CG.

The color gain calculation engine 530 may perform interpolation on output of the selection circuit 550 to generate k intermediate color gain maps, and may apply the k intermediate color gain maps to the 4 k channel image signals IGr1~IGr4, IR1~IR4, IB1~IB4 and IGb1~IGb4 to generate the 4 k color gain maps CGGr1~CGGr4, CGR1~CGR4, CGB1~CGB4 and CGGb1~CGGb4.

For example, the color gain calculation engine 530 may perform bilinear interpolation on the output of the selection circuit 550.

Figure 13A:
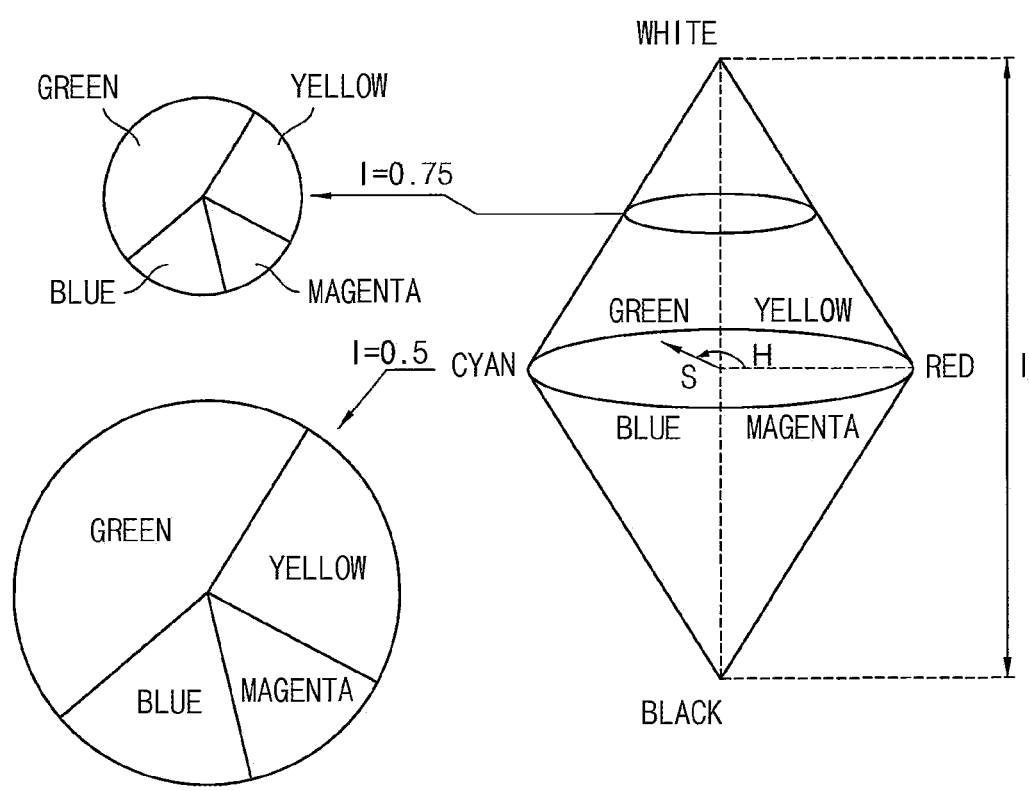
FIG. 13A illustrates HIS color space used in the color detection engine in FIG. 12.

FIG. 13A illustrates HIS color space used in the color detection engine in FIG. 12.

Referring to FIG. 13A the HIS color space is a color model which represents a color using three elements (e.g., hue H, saturation S and intensity I). The hue H indicates a color represented as an angle (0 degree through 360 degree). The saturation S indicates a chroma representing a degree of clearness of color. The intensity I or value V indicates brightness.

In the HSI color space, the hue H may be expressed by following equation 1.

$$H = \cos^{-1}\left[\frac{\frac{1}{2}[(R-G)+(R-B)]}{\sqrt{(R-G)^2(R-B)(G-B)}}\right]$$ [equation 1]

According to some example embodiments, the hue H may be expressed by following equation 2 for simplifying hardware implementation of the calibration module 300.

$$H = \begin{cases} \frac{G-B}{V-\min[R,G,B]} \cdot 60°, & \text{if } V = R \text{ and } G \geq B; \\ \left(\frac{B-R}{V-\min[R,G,B]} + 2\right) \cdot 60°, & \text{if } G = V; \\ \left(\frac{R-G}{V-\min[R,G,B]} + 4\right) \cdot 60, & \text{if } B = V; \\ \left(\frac{R-B}{V-\min[R,G,B]} + 5\right) \cdot 60, & \text{if } V = R \text{ and } G < B \end{cases}$$ [equation 2]

$$H \in [0°, 360°]$$

Figure 13B:
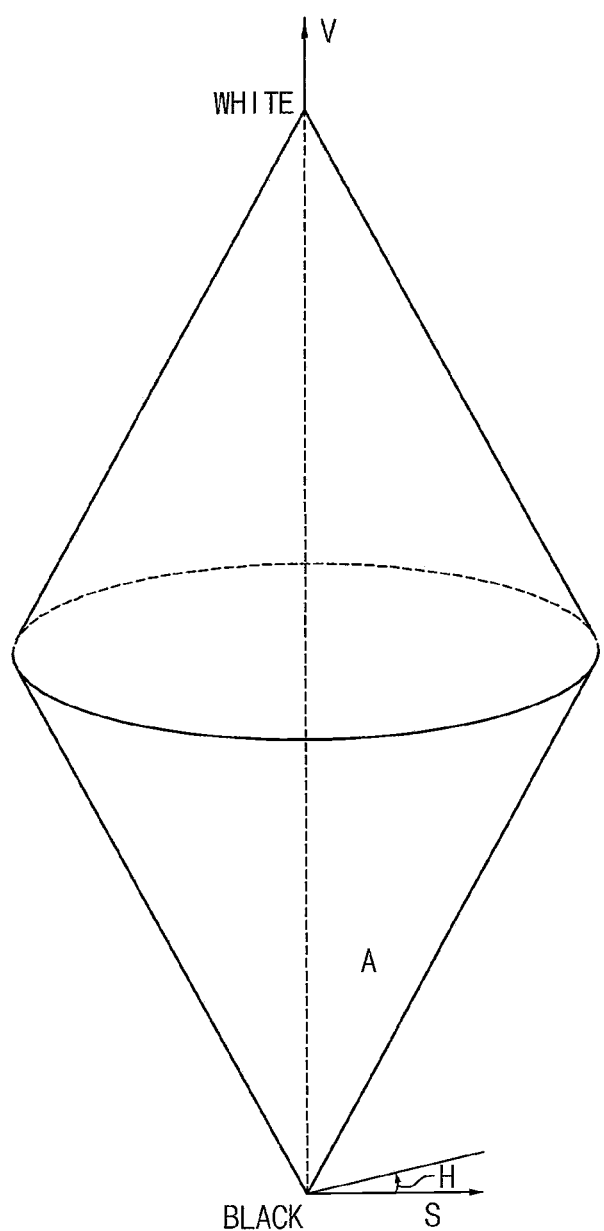
FIG. 13B illustrates an HSV color space used in the color detection engine in FIG. 12.

FIG. 13B illustrates an HSV color space used in the color detection engine in FIG. 12.

Referring to FIG. 13B, the HSV color space is a color model which represents a color using three elements (e.g., hue H, saturation S and value V). The hue H is represented as an angle indicating a direction in which a certain color is located on a horizontal cross-section of a cone. The saturation S is represented as a distance from the center of a hexagon and has an achromatic color in the exact center therefor. The value V is represented as a height of a cone and becomes brighter as height increases. In the HSV color space, a color is represented by coordinates H, S and V.

Figure 14:
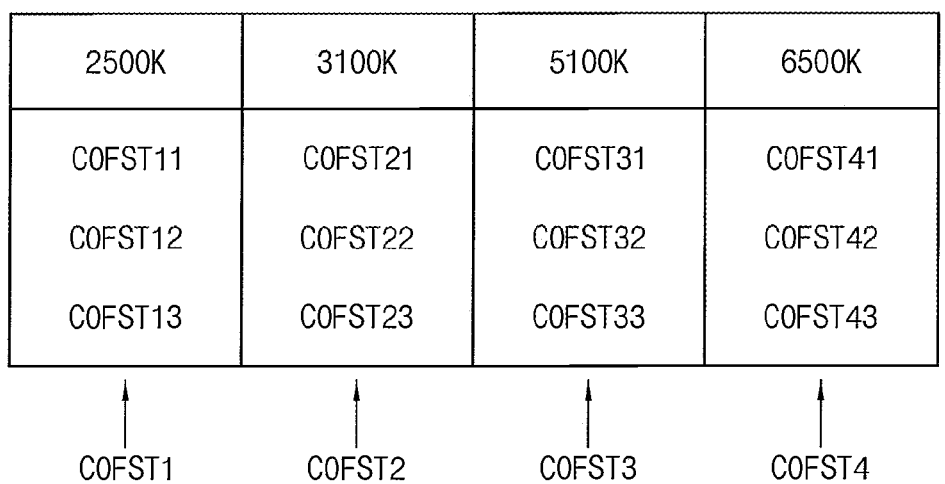
FIG. 14 illustrates a coefficient table included in the storage in the calibration module of FIG. 6 according to some example embodiments.

FIG. 14 illustrates a coefficient table included in the storage in the calibration module of FIG. 6 according to some example embodiments.

Referring to FIG. 14, the storage 305 in the calibration module 300 may store a coefficient table CTB and the coefficient table CTB may store coefficient sets COFST1, COFST2, COFST3 and COFST4 of a linear function which is modeled based on pixel values of image signals generated by a reference image sensor capturing light sources having a plurality of color temperatures 2500 k, 3100K, 5100K and 6500K.

A linear function associated with a reference image sensor may be represented by a following equation 3.

$$\alpha_{TK}x + \beta_{TK}y + \gamma_{TK}$$ [equation 3]

Here, TK represents one of the plurality of color temperatures, and α, β and γ represent coefficients of the linear function under a target (first) color temperature. The first coefficient α may indicate location information of a pixel in a first direction (x axis direction), the second coefficient β may indicate location information of the pixel in a second direction (y axis direction) and the third coefficient γ may be associated with an offset value of the modeled linear function. That is, the first coefficient α and the second coefficient β may be associated with the location of the pixel. The modeled linear function represents a correlation between the color gain under a reference light source and the color gain under each of the plurality of light sources.

In FIG. 14, the coefficient set COFST1 may include first through third coefficients COFST11, COFST12 and COFST13, the coefficient set COFST2 may include first through third coefficients COFST21, COFST22 and COFST23, the coefficient set COFST3 may include first through third coefficients COFST31, COFST32 and COFST33, and the coefficient set COFST4 may include first through third coefficients COFST41, COFST42 and COFST43.

According to some example embodiments, the reference image sensor may capture the plurality of light sources having a plurality of color temperatures to generate the coefficient sets COFST1, COFST2, COFST3 and COFST4 of the reference image sensor, associated with the plurality of color temperatures, and may store the coefficient sets COFST1, COFST2, COFST3 and COFST4 in the storage 305, and a target image sensor may capture an object under a white light source (a first light source) having a reference color temperature of 5100K, and may calibrate color temperature of pixels of the digital image data DDTA generated by the target image sensor under other color temperatures based on the coefficient sets COFST1, COFST2, COFST3 and COFST4 of the reference image sensor.

A gain of the target image senor at a target color temperature may be expressed by a following equation 4.

$$\text{Gain}_{TK}(x,y) = \text{Gain}_{5100K}(x,y) * \text{ColorGain}_{TK}(x,y) \qquad [\text{equation 4}]$$

In equation 4, $\text{Gain}_{TK}(x, y)$ indicates a gain of a pixel located at x and y position in the digital image signal DDTA in the target image sensor at a target color temperature TK, $\text{Gain}_{5100K}(x, y)$ indicates a measured gain of a pixel located at x and y position in the digital image signal DDTA in the target image sensor under the reference light source having a color temperature of 5100K, and $\text{ColorGain}_{TK}(x, y)$ indicates a color gain at a target color temperature TK, which is calculated and stored in advance.

Accordingly, the calibration module 300 may calibrate color temperature of the digital image signal DDTA generated by the target image sensor by calculating color gains of the digital image signal DDTA at color temperatures different from a reference color temperature based on color gains of a digital image signal generated by the reference image sensor at a plurality of color temperatures.

Figure 15:
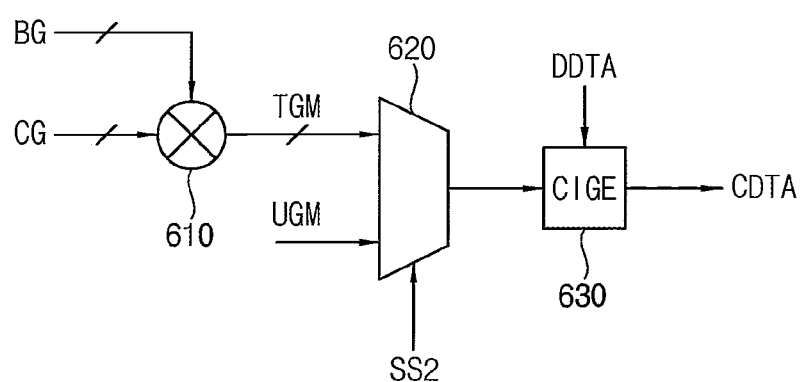
FIG. 15 is a block diagram illustrating the calibrated image generation unit in the calibration module of FIG. 6 according to some example embodiments.

FIG. 15 is a block diagram illustrating the calibrated image generation unit in the calibration module of FIG. 6 according to some example embodiments.

Referring to FIG. 15, the calibrated image generation unit 600 may include a multiplier 610, a selection circuit 620 and a calibrated image generation engine (CIGE) 630.

The multiplier 610 multiplies the color gain CG and the base gain BG of the digital image signal DDTA to output a total gain map TGM.

The selection circuit 620 receives the total gain map TGM and a unity gain map UGM and selects one of the total gain map TGM and the unity gain map UGM in response to a second selection signal SS2. The second selection signal SS2 may be provided from the control engine 303 in FIG. 6.

The calibrated image generation engine 630 applies an output of the selection circuit 620 to the digital image signal DDTA to output the calibrated image signal CDTA.

In some example embodiments, the control engine 305 may control the calibrated image generation unit 600 such that a unity gain is applied to auto focus (AF) pixels, static boundary pixels representing a boundary between objects and saturated pixels from among pixels in the digital image signal DDTA.

That is, the color temperature calibration on the AF pixels, the static boundary pixels and the saturated pixels may be skipped.

The boundary pixel may be set based on a reference pixel. For example, the ISP 210 in FIG. 1 may detect a reference pixel such that a reference color of the reference pixel has a gradient value greater than or equal to a threshold value. For example, the reference color may be a green color.

The ISP 210 may expand a transition region pixel by pixel such that the transition region TRG includes an adjacent pixel in a linear direction from the reference pixel if at least one color of the adjacent pixel in a horizontal direction or a vertical direction has the gradient value greater than or equal to the threshold value. In such expanding process, the ISP 210 may determine certain pixels, all colors (e.g., red, green and blue colors) of which have the gradient values smaller than the threshold value, as boundary pixels.

The ISP 210 may set some of the boundary pixels as static boundary pixels, pixel values of which are not changed.

Figure 16A:
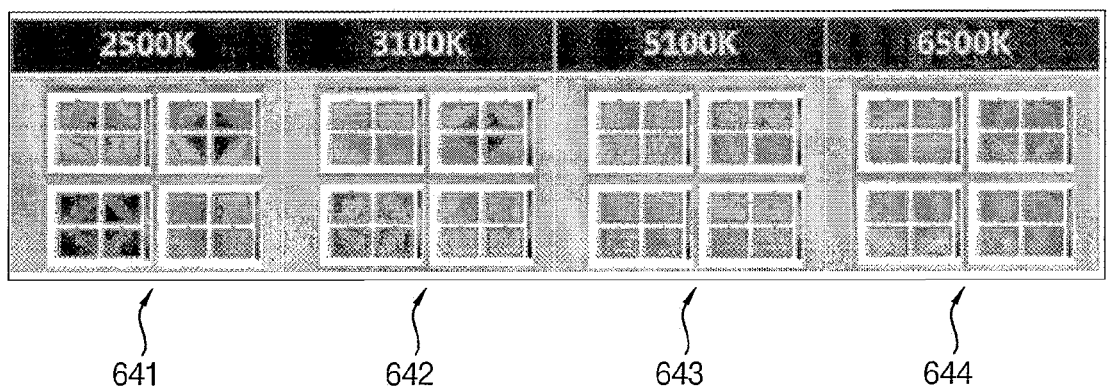
FIG. 16A illustrates an example of crosstalk maps at a plurality of color temperatures in a case in which a reference light source is used and color gains at other color temperatures are wrongly applied.

FIG. 16A illustrates an example of crosstalk maps at a plurality of color temperatures in a case in which a reference light source is used and color gains at other color temperatures are wrongly applied.

In FIG. 16A, a reference numeral 641 indicates a crosstalk map at a color temperature of 2100K, a reference numeral 642 indicates a crosstalk map at a color temperature of 3100K, a reference numeral 643 indicates a crosstalk map at a color temperature of 5100K, and a reference numeral 644 indicates a crosstalk map at a color temperature of 6500K.

Referring to FIG. 16A, when a whit light source having a color temperature of 5100K is used, the crosstalk at each of other color temperatures 2100K, 3100K and 6500K is not calibrated.

Figure 16B:
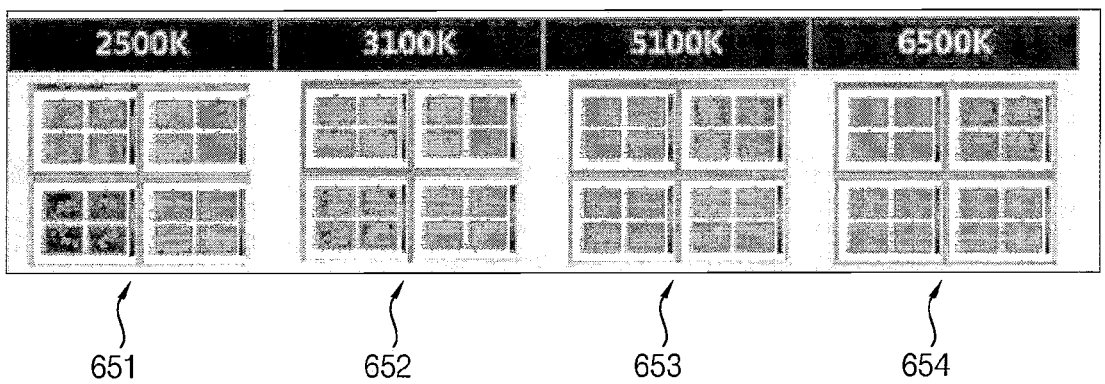
FIG. 16B illustrates an example of crosstalk maps at a plurality of color temperatures in a case in which a reference light source is used and color gains according to example embodiments at other color temperatures are applied.

FIG. 16B illustrates an example of crosstalk maps at a plurality of color temperatures in a case in which a reference light source is used and color gains according to some example embodiments at other color temperatures are applied.

In FIG. 16B, a reference numeral 651 indicates a crosstalk map at a color temperature of 2100K, a reference numeral 652 indicates a crosstalk map at a color temperature of 3100K, a reference numeral 653 indicates a crosstalk map at a color temperature of 5100K and a reference numeral 654 indicates a crosstalk map at a color temperature of 6500K.

Referring to FIG. 16B, even when a whit light source having a color temperature of 5100K is used, the crosstalk at each of other color temperatures 2100K, 3100K and 6500K is calibrated.

Figure 17:
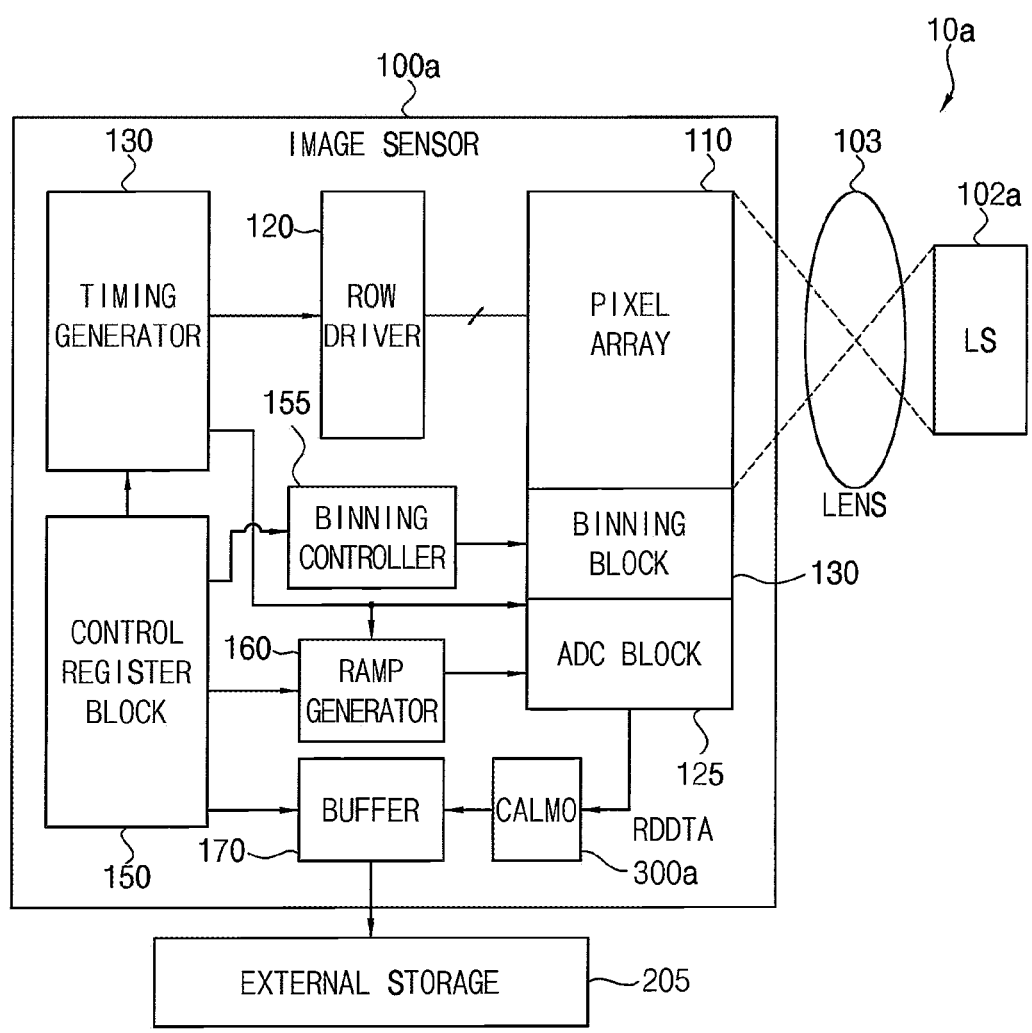
FIG. 17 is a block diagram illustrating an image processing system including a reference image sensor according to some example embodiments.

FIG. 17 is a block diagram illustrating an image processing system including a reference image sensor according to some example embodiments.

Referring to FIG. 17, an image processing system 10a may include an optical lens 103, a reference image sensor 100a and an external storage 205.

The reference image sensor 100a may include a pixel array 110, a row driver 120, an ADC block 125, a binning block 130, a timing generator 140, a control register block 150, a binning controller 155, a ramp generator 160, a calibration module (CALMO) 300a and a buffer 170.

The image processing system 10a of FIG. 17 differs from the image processing system 10 of FIG. 1 in that the reference image sensor 100a captures a light source 102a to generate a reference image data RDDTA and stores the reference image data RDDTA in the external storage 205, the reference image sensor 100a includes the calibration module 300a instead of the calibration module 300 as illustrated in FIG. 1, and the image processing system 10a does not include the DSP 200 and the display 240 as illustrated in FIG. 1.

The reference image sensor 100a may be manufactured from a module whose test result is better than other image sensor and the module whose test result is better may be referred to as a 'golden module'.

The reference image sensor 100*a* may generate the reference image data RDDTA with respect to each of a plurality of color temperatures with changing a color temperature of the light source 102*a*, coefficient sets of the respective color temperatures is calculated by modeling pixel values of the reference image data RDDTA into a linear function, and the calculated coefficient sets may be stored in the external storage 205.

In some example embodiments, the coefficient sets stored in the external storage 205 may be provided to the calibration module 300 of FIG. 6, and may be stored in the storage 305.

Figure 18:
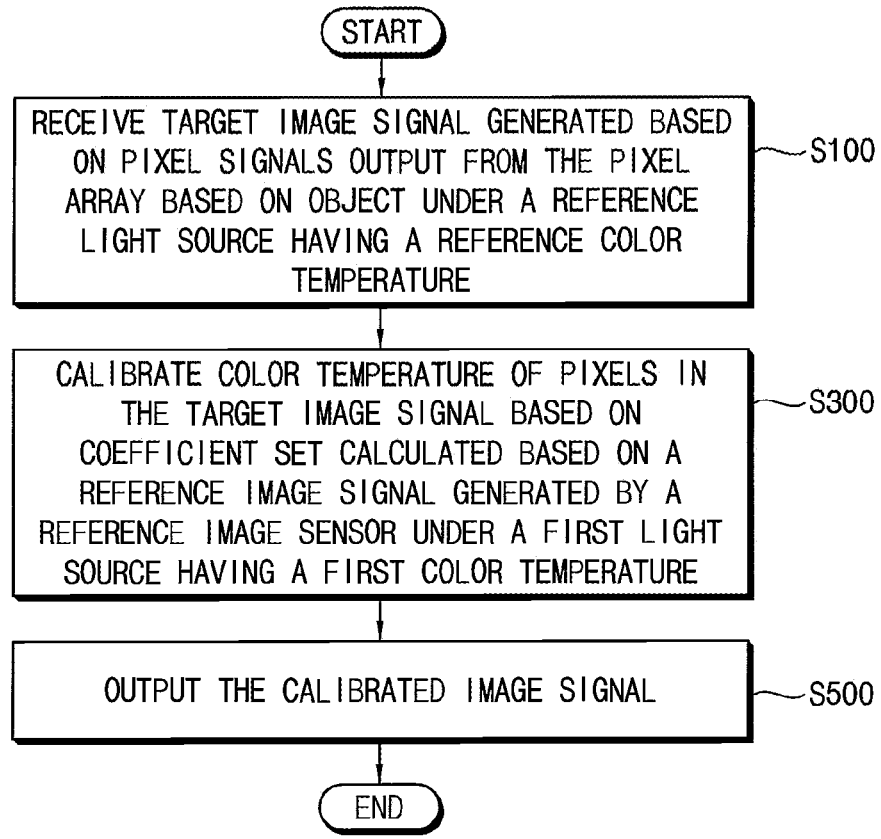
FIG. 18 is a flow chart illustrating a method of calibrating crosstalk of an image signal in an image sensor according to some example embodiments.

FIG. 18 is a flow chart illustrating a method of calibrating crosstalk of an image signal in an image sensor according to some example embodiments.

Referring to FIGS. 1 through 18, in a method of calibrating crosstalk in image sensor 10 which includes a pixel array including a plurality of sub-pixels arranged along a plurality of rows and a plurality of columns, and k (k being an integer equal to or greater than four) adjacent sub-pixels of the plurality of sub-pixels represent one color, a calibration module 300 receives a digital image signal (a target image signal) DDTA generated based on pixel signals output from the pixel array, which are based on an object under a reference light source having a reference light color temperature (operation S100).

The calibration module 300 calibrates color temperature of each of pixels in the digital image signal DDTA based on a coefficient set calculated based on a reference image signal generated by a reference image sensor under a first light source having a first color temperature (operation S300).

The calibration module 300 outputs a calibrated (corrected) image signal CDTA (operation S500).

Figure 19:
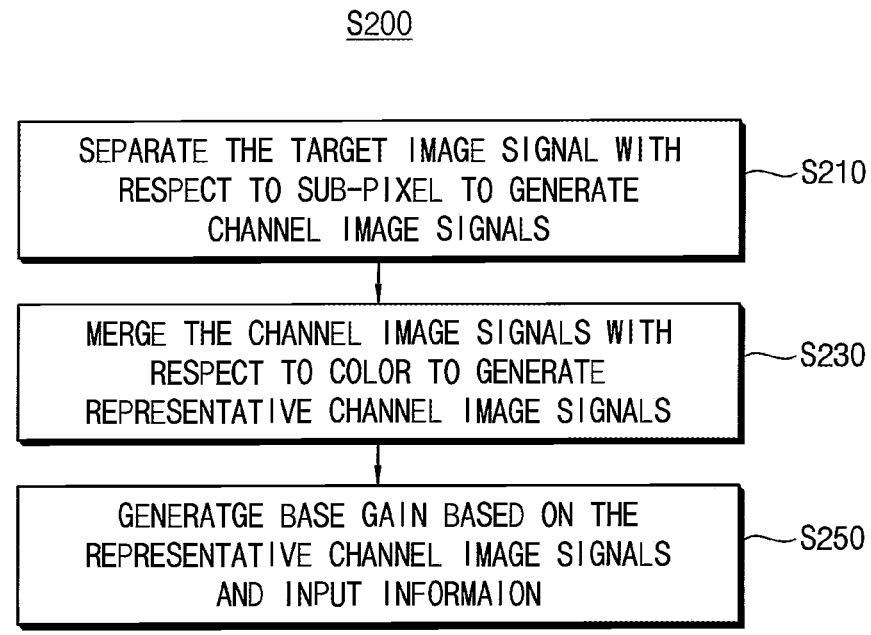
FIG. 19 is a flow chart illustrating a step of generating a base gain according to some example embodiments.

FIG. 19 is a flow chart illustrating a step of generating a base gain according to some example embodiments.

Referring to FIGS. 1 through 17 and 19 for generating a base gain (operation S200), an image separation engine 320 separate the digital image signal DDTA according to a channel of sub-pixels corresponding to each of the color filters to generate 4 k channel image signals IGr1~IGr4, IR1~IR4, IB1~IB4 and IGb1~IGb4 (operation S210).

A representative channel image generation engine 330 averages pixel values of respective ones of the 4 k channel image signals IGr1~IGr4, IR1~IR4, IB1~IB4 and IGb1~IGb4 with respect to corresponding ones of the color filters, to generate k representative channel image signals IGrM, IRM, IBM and IGbM (operation S230), and a base gain calculation engine 400 calculates the base gain BG based on the k representative channel image signals IGrM, IRM, IBM and IGbM and input information (operation S250).

Figure 20:
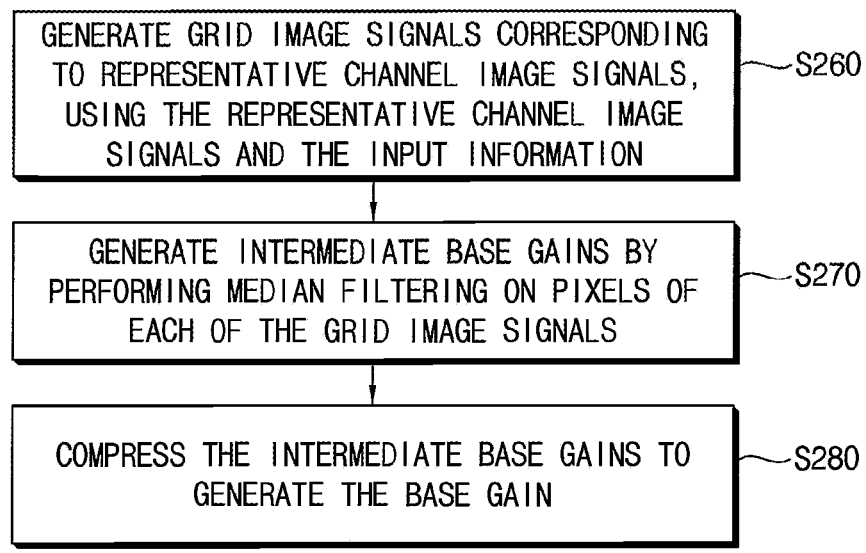
FIG. 20 is a flow chart illustrating an operation of generating the base gain in FIG. 19 according to some example embodiments.

FIG. 20 is a flow chart illustrating an operation of generating the base gain in FIG. 19 according to some example embodiments.

Referring to FIGS. 1 through 17 and 20, for generating the base gain BG (operation S250), a grid image generator 410 samples r*r (r is an integer equal to or greater than two) sub-pixels of the k representative channel image signals IGrM, IRM, IBM and IGbM as one intersecting point, based on the input information IDINF, and generates the k grid image signals IGrM', IRM', IBM' and IGbM' (operation S260).

The base gain generation engine 430 performs a median filtering on internal intersecting points (which does not include boundary intersecting points) of each of the k grid image signals IGrM', IRM', IBM' and IGbM' to generate intermediate base gains MBG for each of the k representative channel image signals IGrM, IRM, IBM and IGbM (operation S270).

A bit packer 450 stores bits of the intermediate base gains MBG, compresses the bits of the intermediate base gains MBG and provides the base gain BG (operation S280).

Figure 21:
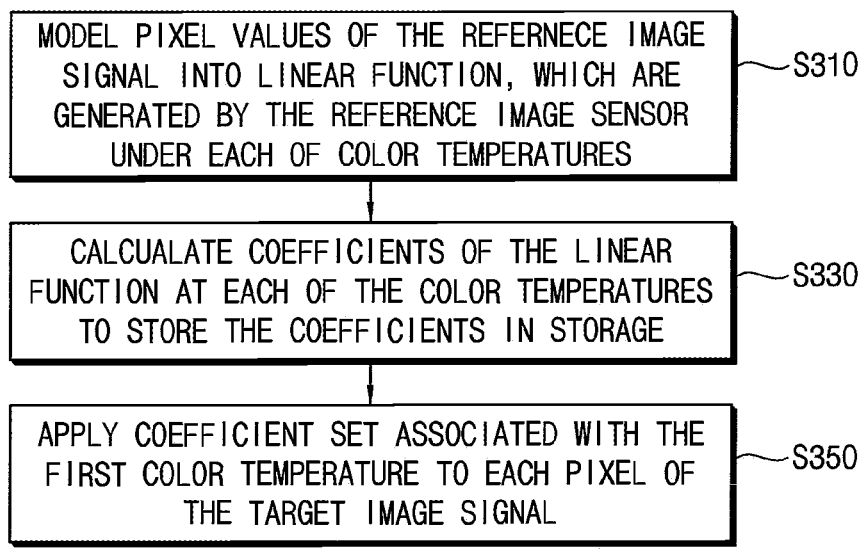
FIG. 21 is a flow chart illustrating an operation of calibrating a color temperature in FIG. 18 according to some example embodiments.

FIG. 21 is a flow chart illustrating an operation of calibrating a color temperature in FIG. 18 according to some example embodiments.

Referring to FIGS. 1 through 18 and 21, for calibrating the color temperature (operation S300), the calibration module 300 or 300*a* models pixel values of the reference image signal into a linear function. The pixel values of the reference image signal are generated by a reference image sensor under each of a plurality of color temperatures (operation S310).

The calibration module 300*a* calculates coefficients of the linear function at each of the color temperatures and stores the calculated coefficients of the linear function at each of the color temperatures in a storage 305 as coefficient sets (operation S330).

A color gain generation unit 500 in the calibration module 300 applies a coefficient set associated with the first color temperature, from among the coefficient sets, to each pixel of the digital image signal (target image signal) DDTA (operation S350).

Therefore, according to some example embodiments, the calibration module may calibrate color temperature of the digital image signal generated by the target image sensor by calculating color gains of the digital image signal at color temperatures different from a reference color temperature based on color gains of a digital image signal generated by the reference image sensor at a plurality of color temperatures.

Figure 22:
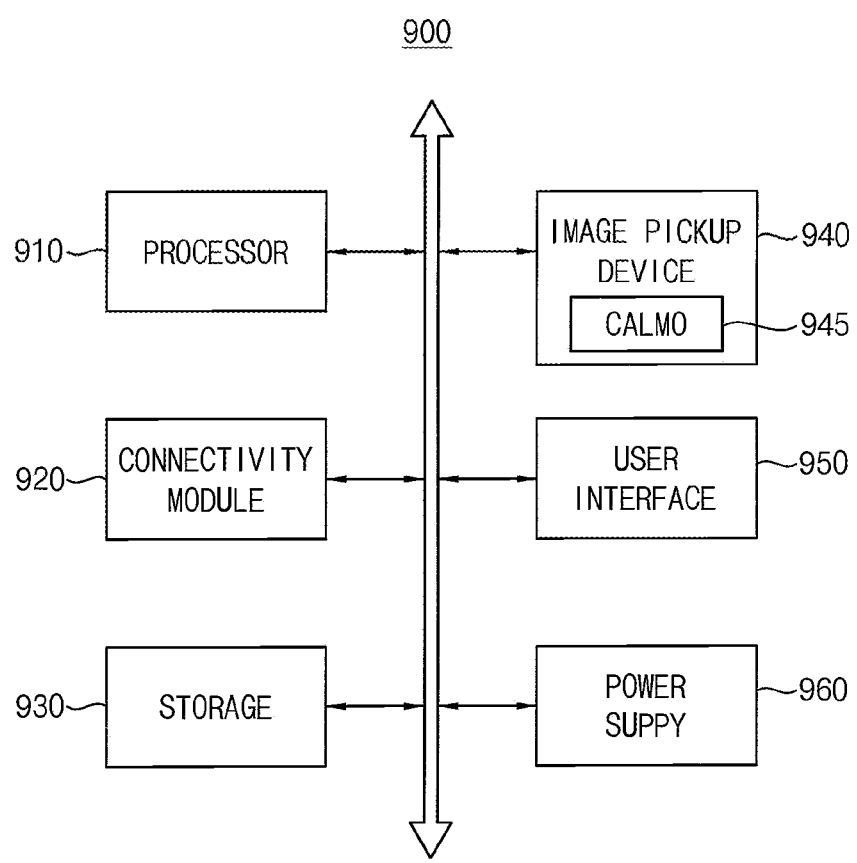
FIG. 22 is a block diagram illustrating an electronic system according to example embodiments.

FIG. 22 is a block diagram illustrating an electronic system according to some example embodiments.

Referring to FIG. 22, an electronic system 900 includes a processor 910 and an image pickup device 940. The electronic system 900 may further include a connectivity module 920, a storage device 930, a user interface 950 and a power supply 960.

The processor 910 controls overall operations of the electronic system 900. The image pickup device 940 is controlled by the processor 910. The image pickup device 940 may be the image processing system of FIG. 1.

The image pickup device 940 may include a calibration module (CALMO) 945 and may calibrate color temperature of a digital image signal generated by the target image sensor by calculating color gains of the digital image signal at color temperatures different from a reference color temperature based on color gains of a digital image signal generated by a reference image sensor at a plurality of color temperatures The connectivity module 920 may communicate with an external device (not shown). The storage device 930 may operate as data storage for data processed by the processor 910 or a working memory in the electronic system 900.

The user interface 950 may include at least one input device such as, for example, a keypad, a button, a touch screen, etc., and/or at least one output device such as, for example, a display device, etc. The power supply 960 may provide power to the electronic system 900.

Figure 23:
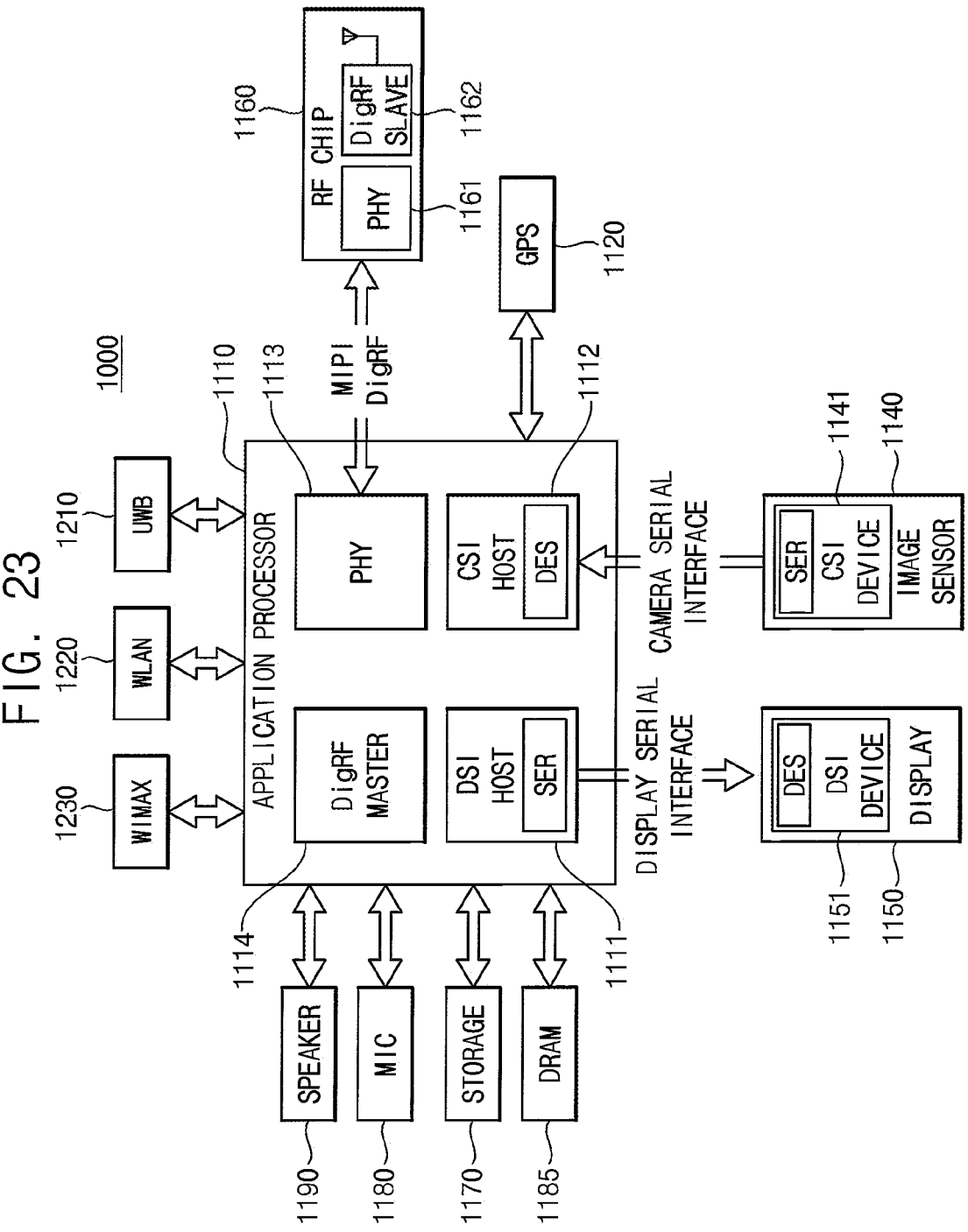
FIG. 23 is a block diagram illustrating an electronic system including an image sensor according to some example embodiments.

FIG. 23 is a block diagram illustrating an electronic system including an image sensor according to some example embodiments.

Referring to FIG. 23, an electronic system 1000 may be implemented as a data processing device that uses or supports a mobile industry processor interface (MIPI) interface. The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. Further, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls an operation of the image sensor 1140. The image sensor 1140 may be the image sensor according to some example embodiments, and may perform or execute the method of operating the image sensor according to example embodiments.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

The inventive concepts may be applied to various electronic devices and systems including image pick-up devices. For example, the inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The units, circuitries and/or modules described herein may be implemented using hardware components and a combination of software components and hardware components. For example, the hardware components may include microcontrollers, memory modules, sensors, amplifiers, band-pass filters, analog to digital converters, and processing devices, or the like. A processing device may be implemented using one or more hardware device(s) configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device(s) may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors, multi-core processors, distributed processing, or the like.

The foregoing is illustrative of some example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor, comprising:
a pixel array including a plurality of sub-pixels arranged along a plurality of rows and a plurality of columns, and k number of sub-pixels representing one color pixel in conjunction with each other, where k is an integer equal to or greater than four; and
calibration circuitry configured to,
receive digital image signal generated based on pixel signals output from the pixel array,
calculate a color gain of the digital image signal based on a coefficient set calculated based on a reference image signal generated by a reference image sensor under a first light source having a first color temperature,
store coefficient sets associated with a plurality of color temperatures including the first color temperature, and
apply the color gain to the digital image signal to generate a calibrated image signal,
wherein each of the coefficient sets includes a first coefficient, a second coefficient, and a third coefficient of a linear function which is modeled based on pixel values of image signals generated by the reference image sensor capturing light sources having the plurality of color temperatures,
the first coefficient and the second coefficient are associated with a location of each of pixels in each of the image signals, and
the third coefficient is associated with an offset value of the modeled linear function.

2. The image sensor of claim 1, wherein,
the modeled linear function represents a correlation between the color gain under a reference light source and the color gain under each of the plurality of light sources.

3. The image sensor of claim 1, wherein the calibration circuitry is further configured to,
receive the digital image signal and input information associated with the digital image signal,
generate a base gain of the digital image signal based on the digital image signal and the input information.

4. The image sensor of claim 3, wherein
the plurality of sub-pixels includes a first color filter, a second color filter, a third color filter, and a fourth color filter, each of the first to the fourth color filter being associated with the k number of sub-pixels, and the calibration circuitry is further configured to,
separate the digital image signal into 4 k number of channel image signals with respect to each channel of sub-pixels corresponding to each of the first, second, third and fourth color filters, calculate a representative value of pixel values of each of the 4 k number of channel image signals with respect to each of the first, second, third and fourth color filters to generate k representative channel image signals, and calculate the base gain based on the k representative channel image signals and the input information.

5. The image sensor of claim 4, wherein
the digital image signal has a first size defined by p (p is a multiple of four and is greater than four) sub-pixels along a first direction and q (q is a multiple of four and is greater than four) sub-pixels along a second direction perpendicular to the first direction, and
each of the channel image signals and each of the representative channel image signals have a second size defined by p/k sub-pixels along the first direction and q/k sub-pixels along the second direction.

6. The image sensor of claim 4, wherein the calibration circuitry is further configured to,
sample r*r (r being an integer equal to or greater than two) sub-pixels of each of the k representative channel image signals, as one intersecting point, based on the input information to generate k grid image signals,
perform a filtering on internal intersecting points of each of the k grid image signals to generate intermediate base gains for respective ones of the k representative channel image signals, the internal intersecting points of each of the k grid image signals corresponding to intersecting points except boundary intersecting points located in an outskirt region in each of the k grid image signals, and
store bits of the intermediate base gains to provide the base gain by compressing the bits.

7. The image sensor of claim 6, wherein the calibration circuitry is further configured to,
generate a corresponding intermediate base gain based on pixel values of adjacent two intersecting points for each of corner intersecting points of the boundary intersecting points, and
generate a corresponding intermediate base gain for each of rest intersecting points of the boundary intersecting points, except the corner intersecting points, based on (1) a pixel value of a sub-pixel of one of the representative channel image signals corresponding to each of the rest intersecting points and (2) a pixel value of an intersecting point adjacent to each of the rest intersecting points in a first direction.

8. The image sensor of claim 6, wherein the calibration circuitry is further configured to apply the base gain to the digital image signal to output the calibrated image signal.

9. The image sensor of claim 1, wherein
the plurality of sub-pixels includes a first color filter, a second color filter, a third color filter and a fourth color filter with respect to k adjacent sub-pixels, and
wherein the calibration circuitry is further configured to,
separate the digital image signal according to a channel of sub-pixels corresponding to each of the first, second, third and fourth color filters to generate 4 k channel image signals, detect a color of the digital image signal to provide color information indicating the detected color,
store coefficient sets associated with a plurality of color temperatures or a plurality of light sources,
select a coefficient set associated with the first color temperature, from among the coefficient sets, in response to the color information and a selection signal, and
configured to apply the selected coefficient set to pixels of each of the 4 k channel image signals.

10. The image sensor of claim 9, wherein the calibration circuitry is further configured to detect a color of the digital image signal based on hue, saturation and intensity (HIS) color space.

11. The image sensor of claim 1, wherein the calibration circuitry is further configured to store the coefficient sets associated with the plurality of color temperatures in a form of table.

12. The image sensor of claim 1, wherein the calibration circuitry is further configured to,
multiply the color gain and a base gain of the digital image signal to output a total gain map;
select one of the total gain and a unity gain in response to a selection signal; and
apply a selected one of the total gain and the unity gain to each of pixels in the digital image signal to output the calibrated image signal.

13. The image sensor of claim 12, wherein the calibration circuitry is further configured to control such that the unity gain is applied to auto focus (AF) pixels, static boundary pixels representing a boundary between objects, and saturated pixels, from among the pixels in the digital image signal.

14. An image sensor comprising:
pixel array including a plurality of sub-pixels arranged along a plurality of rows and a plurality of columns, and k number of sub-pixels representing one color in conjunction with each other, where k is an integer equal to or greater than four;
an analog-to-digital converter (ADC) configured to perform an analog-to-digital conversion on a pixel signal output from the pixel array to generate a digital image signal; and
calibration circuitry configured to receive the digital image signal, and calibrate a color temperature of the digital image signal based on a reference color gain of a reference image signal to output a calibrated image signal, the reference image signal being generated by a reference image sensor,
wherein the calibration circuitry is further configured to,
receive the digital image signal,
calculate a color gain of the digital image signal based on a coefficient set calculated based on the reference image signal generated by the reference image sensor under a first light source having a first color temperature,
store coefficient sets associated with a plurality of color temperatures including the first color temperature, and
apply the color gain to the digital image signal to generate the calibrated image signal, and
wherein each of the coefficient sets includes a first coefficient, a second coefficient and a third coefficient of a linear function which is modeled based on pixel values of image signals generated by the reference image sensor capturing light sources having the plurality of color temperatures, the first coefficient and the second coefficient are associated with a location of each of pixels in each of the image signals, and the third coefficient is associated with an offset value of the modeled linear function.

15. The image sensor of claim 14, further comprising:
receive the digital image signal and input information associated with the digital image signal,
generate a base gain of the digital image signal based on the digital image signal and the input information, and
further apply the base gain to the digital image signal to output the calibrated image signal.

16. A method of calibrating crosstalk in an image sensor, the image sensor including a pixel array including a plurality of sub-pixels arranged along a plurality of rows and a plurality of columns, k number of sub-pixels representing one color in conjunction with each other, where k is an integer equal to or greater than four, the method comprising:
receiving, at calibration circuitry of the image sensor, a digital image signal generated based on pixel signals output from the pixel array;
calibrating, at the calibration circuitry, a color temperature of each of pixels in the digital image signal based on a coefficient set calculated based on a reference image signal generated by a reference image sensor under a first light source having a first color temperature; and
outputting, at the calibration circuitry, a calibrated image signal,
wherein the coefficient set includes a first coefficient, a second coefficient and a third coefficient of a linear function which is modeled based on a pixel value of an image signal generated by the reference image sensor,
the first coefficient and the second coefficient are associated with a location of each of pixels in the image signal, and
the third coefficient is associated with an offset value of the modeled linear function.

17. The method of claim 16, wherein calibrating the color temperature includes,
modeling pixel values of reference image signals, which are generated by the reference image sensor capturing light sources having a plurality of color temperatures, into a linear function,
calculating coefficients of the linear function that are associated with each of the plurality of color temperatures and storing the coefficients, and
applying a set of the coefficients associated with the first color temperature of the plurality of color temperatures to each of the pixels of the digital image signal.

* * * * *